(12) United States Patent
Pannell

(10) Patent No.: US 9,882,823 B2
(45) Date of Patent: Jan. 30, 2018

(54) SYSTEMS AND METHODS FOR BLOCKING TRANSMISSION OF A FRAME IN A NETWORK DEVICE

(71) Applicant: Marvell World Trade Ltd., St. Michael (BB)

(72) Inventor: Donald Pannell, Cupertino, CA (US)

(73) Assignee: Marvell World Trade Ltd., St. Michael (BB)

( * ) Notice: Subject to any disclaimer, the term of this patent is extended or adjusted under 35 U.S.C. 154(b) by 66 days.

(21) Appl. No.: 14/733,370

(22) Filed: Jun. 8, 2015

(65) Prior Publication Data

US 2015/0365338 A1    Dec. 17, 2015

Related U.S. Application Data

(60) Provisional application No. 62/010,542, filed on Jun. 11, 2014, provisional application No. 62/011,760, filed on Jun. 13, 2014.

(51) Int. Cl.
*H04L 12/28* (2006.01)
*H04L 12/863* (2013.01)
(Continued)

(52) U.S. Cl.
CPC ........ *H04L 47/6215* (2013.01); *H04J 3/0635* (2013.01); *H04J 3/0697* (2013.01);
(Continued)

(58) Field of Classification Search
None
See application file for complete search history.

(56) References Cited

U.S. PATENT DOCUMENTS

| 5,774,700 A | 6/1998 | Fisch et al. |
| 5,822,381 A | 10/1998 | Parry et al. |

(Continued)

FOREIGN PATENT DOCUMENTS

| CN | 101364932 A | 2/2009 |
| CN | 101414958 A | 4/2009 |

(Continued)

OTHER PUBLICATIONS

PCT International Search Report and Written Opinion of the International Searching Authority dated Jun. 28, 2012 corresponding to PCT/US2012/028290; 10 pages.

(Continued)

*Primary Examiner* — Willie J Daniel, Jr.

(57) ABSTRACT

A network device including a queue, a timing module, an adjustment module, a register module and a blocking shaper. The queue is configured to store a frame. The timing module is configured to generate a local clock signal. The adjustment module is configured to determine (i) based on a first edge of a global clock signal, an expected time of a second edge of the global clock signal, and (ii) a window centered on the expected time of the second edge of the global clock signal. The register module is configured to capture a time of a first edge of the local clock signal. The adjustment module is configured to, based on the captured time of the first edge of the local clock signal and the time of the first edge of the global clock signal, generate an adjustment signal to center a second edge of the local clock signal in the window. The blocking shaper is configured to, subsequent to adjusting the second edge of the local clock signal, block transmission of the frame from the network device based on timing of the local clock signal.

32 Claims, 14 Drawing Sheets

(51) Int. Cl.
*H04J 3/06* (2006.01)
*H04L 12/875* (2013.01)
*H04L 12/937* (2013.01)
*H04L 12/801* (2013.01)
*H04L 12/841* (2013.01)

(52) U.S. Cl.
CPC ............ *H04L 47/56* (2013.01); *H04L 49/253* (2013.01); *H04L 47/10* (2013.01); *H04L 47/283* (2013.01)

(56) References Cited

U.S. PATENT DOCUMENTS

| | | | |
|---|---|---|---|
| 6,038,230 | A | 3/2000 | Ofek |
| 6,707,791 | B1 | 3/2004 | Sundqvist |
| 6,707,821 | B1 | 3/2004 | Shaffer et al. |
| 6,785,236 | B1 | 8/2004 | Lo et al. |
| 7,120,113 | B1 | 10/2006 | Zhang et al. |
| 7,426,206 | B1 | 9/2008 | Ofek et al. |
| 7,668,103 | B1 | 2/2010 | Pannell et al. |
| 7,924,711 | B2 | 4/2011 | Rosen |
| 8,171,152 | B2 | 5/2012 | White et al. |
| 8,238,250 | B2 | 8/2012 | Fung |
| 8,379,644 | B1 | 2/2013 | Pannell |
| 8,417,934 | B2 | 4/2013 | Kondapalli et al. |
| 8,838,787 | B2 | 9/2014 | Gelter et al. |
| 8,937,974 | B1 | 1/2015 | Pannell |
| 8,953,580 | B2 | 2/2015 | Yang et al. |
| 8,982,896 | B2 | 3/2015 | Pannell |
| 2002/0118692 | A1 | 8/2002 | Oberman et al. |
| 2002/0174255 | A1 | 11/2002 | Hayter et al. |
| 2003/0142696 | A1 | 7/2003 | Holmeide et al. |
| 2004/0052213 | A1 | 3/2004 | Cankaya et al. |
| 2004/0114516 | A1 | 6/2004 | Iwata et al. |
| 2004/0202191 | A1 | 10/2004 | Vrabel |
| 2005/0111362 | A1 | 5/2005 | Freytsis et al. |
| 2006/0239333 | A1 | 10/2006 | Albert et al. |
| 2008/0095053 | A1 | 4/2008 | Chen et al. |
| 2009/0135958 | A1 | 5/2009 | Rueckriem et al. |
| 2012/0163521 | A1 | 6/2012 | Kirrmann et al. |
| 2012/0230348 | A1 | 9/2012 | Pannell |
| 2013/0215743 | A1 | 8/2013 | Pannell |
| 2014/0071823 | A1 | 3/2014 | Pannell |
| 2014/0341032 | A1 | 11/2014 | Thaler |
| 2015/0365337 | A1 | 12/2015 | Pannell |
| 2015/0365338 | A1 | 12/2015 | Pannell |

FOREIGN PATENT DOCUMENTS

| | | |
|---|---|---|
| CN | 101548510 A | 9/2009 |
| CN | 102132530 A | 7/2011 |
| WO | WO-2012104623 A2 | 8/2012 |
| WO | WO-2012122382 A1 | 9/2012 |
| WO | WO-2013126630 A1 | 8/2013 |
| WO | WO-2014043092 A1 | 3/2014 |

OTHER PUBLICATIONS

Finn, Norman, "Preemptive Transmission advantages", Jan. 2012, IEEE 802.1, 12 pages.
Yoram Ofek et al; "The Integrated Metanet Architecture: A Switch-Based Multimedia LAN for Parallel Computing and Real-Time Traffic"; Proceedings of the Conference on Computer Communications (INFOCOM), Los Alamitos, IEEE Comp. Soc. Press., US, vol. 2, Jun. 12, 1994; pp. 802-811.
Min-Jun Kim et al.; "Frame Forwarding Rules for Link Utilization in IEEE 802.1 AVB Networks"; Advanced Language Processing and Web Information Technology; 2008. ALPIT '08. International Conference on, IEEE, Piscataway, NJ, USA; Jul. 23, 2008; pp. 509-512.
PCT International Search Report and Written Opinion of the International Searching Authority dated Dec. 12, 2013 corresponding to PCT/US2013/058954; 11 pages.
Yong-Do Choi et al.; "A Forwarding Method on the IEEE 802.1 AVB"; Advanced Language Processing and Web Information Technology, 2008. ALPIT '08; International Conference on, IEEE, Piscataway, NJ, USA, Jul. 23, 2008; pp. 497-502.
Pannell, Don, "AVB—Generation 2 Latency Improvement Options", Mar. 2011; IEEE 802.1; 46 pages.
PCT International Search Report and Written Opinion of the International Searching Authority dated Jun. 13, 2013 corresponding to PCT/US2013/027223; 7 pages.
IEEE Std. 802.11-2012; IEEE Standard for Information technology—Telecommunications and information exchange between systems Local and metropolitan area networks—Specific requirements; Part 11: Wireless LAN Medium Access Control (MAC) and Physical Layer (PHY) Specifications; IEEE Computer Society; Sponsored by the LAN/MAN Standards Committee; Mar. 29, 2012; 2793 pages.
IEEE Std 802.11a-1999 (Supplement to IEEE Std 802.11-1999) Supplement to IEEE Standard for Information technology—Telecommunications and information exchange between systems—Local and metropolitan area networks—Specific requirements-Part11: Wireless LAN Medium Access Control (MAC) and Physical Layer (PHY) specifications: High-Speed Physical Layer in the 5 Ghz Band; LAN/MAN Standards Committee of the IEEE Computer Society; Sep. 16, 1999; 91 pages.
IEEE Std. 802.11b; Supplement to IEEE Standard for Information technology—Telecommunications and information exchange between systems—Local and metropolitan area networks—Specific Requirements—Part 11: Wireless Lan Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 2009; 96 pages.
IEEE P802.119/D8.2 Draft Supplement to Standard [for] Information Technology—Telecommunications and information exchange between systems—Local and metropolitan area networks—Specific requirements-Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; Apr. 2003; 69 pages.
Kiran Gunnam et al.; "Multi-Rate Layered Decoder Architecture for Block LDPC Codes of the IEEE 802.11n Wireless Standard"; 2007; pp. 1645-1648.
802.16-2009 IEEE Standard for Local and Metropolitan area networks; Part 16: Air Interface for Broadband Wireless Access Systems; IEEE Computer Society and the IEEE Microwave Theory and Techniques Society; Sponsored by the LAN/MAN Standard Committee; May 29, 2009; 2082 pages.
IEEE Std 802.20-2008; IEEE Standard for Local and metropolitan area networks; Part 20: Air Interface for Mobile Broadband Wireless Access Systems Supporting Vehicular Mobility—Physical and Media Access Control Layer Specification; IEEE Computer Society; Sponsored by the LAN/MAN Standards Committee; Aug. 29, 2008; 1032 pages.
"Specification of the Bluetooth System" Master Table of Contents & Compliance Requirements—Covered Core Package version: 4.0; Jun. 30, 2010; 2302 pages.
IEEE P802.11ac / D2.0; Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 4: Enhancements for Very High Throughput for Operation in Bands below 6 GHz; Prepared by the 802.11 Working Group of the 802 Committee; Jan. 2012; 359 pages.
IEEE P802.11ad / D5.0 (Draft Amendment based on IEEE P802.11REVmb D10.0) (Amendment to IEEE 802.11REVmb D10.0 as amended by IEEE 802.11ae D5.0 and IEEE 802.11aa D6.0); Draft Standard for Information Technology—Telecommunications and Information Exchange Between Systems—Local and Metropolitan Area Networks—Specific Requirements; Part 11: Wireless LAN Medium Access Control (MAC) and Physical Layer (PHY) Specifications—Amendment 3: Enhancements for Very High Throughput

(56) References Cited

OTHER PUBLICATIONS in the 60 GHz Band; Sponsor IEEE 802.11 Committee of the IEEE Computer Society; Sep. 2011; 601 pages.
IEEE P802.11ah / D1.0 (Amendment to IEEE Std 802.11REVmc / D1.1, IEEE Std 802.11ac / D5.0 and IEEE Std 802.11af / D3.0) Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation; Prepared by the 802.11 Working Group of the LAN/MAN Standards Committee of the IEEE Computer Society; Oct. 2013; 394 pages.
IEEE Std 802.11h 2003 (Amendment to IEEE Std 802.11, 1999 Edition (Reaff 2003) as amended by IEEE Stds 802.11a 1999, 802.11b 1999, 802.11b 1999/Cor 1-2001, 802.11d 2001, and 802.11g 2003); IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 5: Spectrum and Transmit Power Management Extensions in the 5 GHz band in Europe; IEEE Computer Society, Sponsored by the LAN/MAN Standards Committee; Oct. 14, 2003; 75 pages.
IEEE Std 802.1Qav—2009 (Amendment to IEEE Std. 802.1Q-2005) IEEE Standard for Local and metropolitan area networks—Virtual Bridged Local Area Networks, Amendment 12: Forwarding and Queuing Enhancements for Time-Sensitive Streams; IEEE Computer Society, Sponsored by the LAN/MAN Standards Committee; Jan. 5, 2010; 87 pages.
Soren Rumpf et al.; "Software Stacks for Mixed-critical Applications: Consolidating IEEE 802.1 AVB and Time-triggered Ethernet in Next-generation Automotive Electronics"; Department of Computer Science Hamburg University of Applied Sciences, Germany; 2014; 5 pages.
802.1AS—Timing and Synchronization; "Standard for Local and Metropolitan Area Networks—Timing and Synchronization for Time-Sensitive Applications in Bridged Local Area Networks"; Editor-Geoff Garner; May 25, 2006; 7 pages.
IEEE 802.1 Qbv Draft 5C's for Time Aware Shaper enhancement to 802.1Q; Version 2, Edited by Don Pannell at Marvell; Jan. 2012; 7 pages.
PCT International Search Report and Written Opinion of the International Searching Authority dated Sep. 11, 2015 corresponding to PCT/US2015/034879; 13 pages.
First Office Action dated Feb. 28, 2017 corresponding to Chinese Patent Application No. 201380047085.2, 8 pages.
Office Action for Chinese Application No. CN 201380010506.4 dated Oct. 25, 2016; 5 pages.

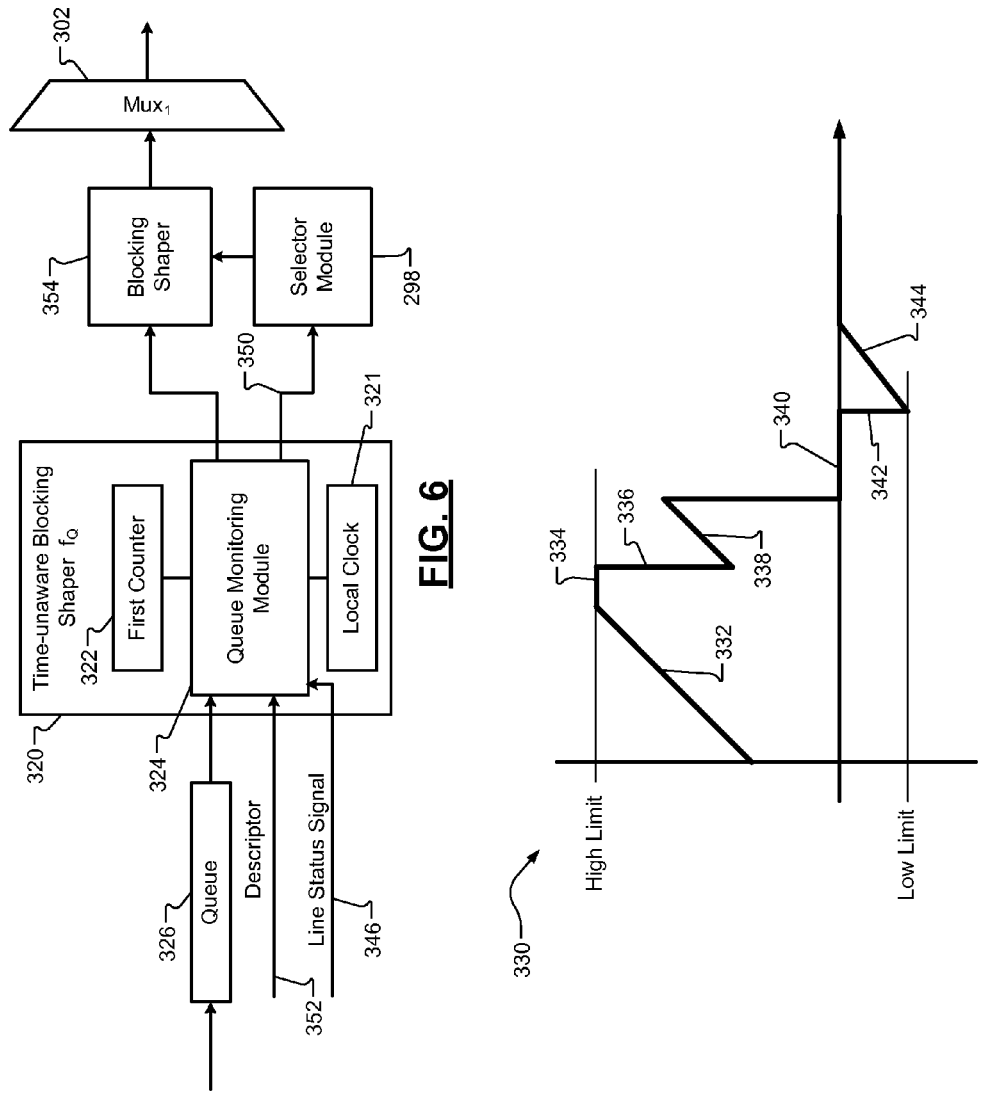

SYSTEMS AND METHODS FOR BLOCKING TRANSMISSION OF A FRAME IN A NETWORK DEVICE

CROSS-REFERENCE TO RELATED APPLICATIONS

This present disclosure claims the benefit of U.S. Provisional Application No. 62/010,542, filed on Jun. 11, 2014 and U.S. Provisional Application No. 62/011,760, filed on Jun. 13, 2014. The present disclosure is related to U.S. Utility application Ser. No. 14/733,296, filed on Jun. 8, 2015. The present application is also related to U.S. Utility application Ser. No. 13/415,112, filed on Mar. 8, 2012 (now U.S. Pat. No. 8,982,896). The disclosures of the above applications are incorporated herein by reference in their entirety.

FIELD

The present disclosure relates to networks, and more particularly to timing controlled transfer of data from ports of data sources and bridges in a non-arbitrary network.

BACKGROUND

A data communication network may include multiple talkers (or sources of data) and multiple receivers. Any number of bridges may be connected in a daisy chain between each of the talkers and the receivers. The data communication network may be an arbitrary network (referred to as a non-engineered network) or non-arbitrary network (referred to as an engineered network). An arbitrary network may be, for example, a residential local area network (LAN), which may have different network devices (e.g., computers, cellular phones, televisions, printers, and electronic tablets) arbitrarily connecting and disconnecting at various points in the network and at random times. The network devices may connect and disconnect at any time regardless of the priority levels of data being transmitted in the arbitrary network.

A non-arbitrary network may be, for example, an automotive network within a vehicle or a manufacturing assembly line network. In general, network devices in a non-arbitrary network are fixed and are not being connected and/or disconnected from the non-arbitrary network. Although network devices may be connected to and/or disconnected from a non-arbitrary network, communication with a network device that is being connected to or disconnected from the non-arbitrary network is prevented during transmission periods of high-priority data. During these transmission periods, high-priority data is transmitted between network devices in the non-arbitrary network.

For example, a non-arbitrary Ethernet network that is operating according to Institute of Electrical and Electronics Engineers (IEEE) 802.1BA may include a talker (or source), multiple bridges and a listener (or receiver). The talker may transmit high-priority data to the listener over the bridges during allocated transmission periods of periodic transmission time intervals. High-priority data may refer to, for example, Class A or Class B data with low-latency requirements. The term latency refers to time for a frame to be transmitted through one or more hops of the non-arbitrary network. The latency of a single hop is measured from a time when a last bit of a frame is received by a network device for that hop to a time when the last bit is transmitted from the network device. For store-and-forward methods, the latency of a single hop is measured from the last bit into the network device to the last bit out of the network device. For cut-through methods, the latency is measured from the first bit into the network device to the first bit out of the network device. A single hop may refer to a talker (referred to as an end station) or a bridge of the non-arbitrary network.

In a non-arbitrary network, transmitted data may have, for example, one of three priority levels. Class A data may include audio video bridging (AVB) data with a highest priority level. Although AVB data may include audio data and/or video data, AVB data may also include control data, user data, reference data, or other types of data. The highest priority level data may be provided with a predetermined amount of bandwidth and a predetermined maximum latency. This assures that the Class A data is transmitted during allocated time periods and latency associated with transmitting the Class A data over a predetermined number of hop(s) and/or between end stations is less than the predetermined maximum latency. Class B data may be AVB data with a next highest priority level. Non-AVB data may have a lowest priority level. In general, higher priority data is transmitted before lower priority data.

IEEE 802.1 Qbv is a specification for a time aware shaper in the AVB generation 2 network and is referred to as time sensitive networking (TSN). Network devices operating according to IEEE 802.1 Qbv may connect to a network at any time. However, the communication and/or use of the network by the network devices may be restricted such that high priority data is permitted to pass through the network ahead of the communication and/or use by the network devices.

Fast Ethernet (FE) refers to transmitting data at 100 mega-bits per second (Mbits/s). Gigabyte Ethernet (GE) refers to transmitting one giga-bit per second (Gbits/s). According to IEEE 802.1 AVB standards for a generation 1 Ethernet network (at FE or GE transmission speeds), a Class A frame of data is to pass through seven hops in less than 2 milli-seconds (ms) and a Class B frame of data is to pass through seven hops in less than 50 ms. According to IEEE 802.1 AVB goal 1 for a generation 2 network a Class A frame is to pass through 32 GE transmission speed hops in less than 125 µs. Time to transmit data over wireless connections is longer than time to transmit data over wired connections.

SUMMARY

A network device is provided and includes a queue, a timing module, an adjustment module, a register module and a blocking shaper. The queue is configured to store a frame. The timing module is configured to generate a local clock signal. The adjustment module is configured to determine (i) based on a first edge of a global clock signal, an expected time of a second edge of the global clock signal, and (ii) a window centered on the expected time of the second edge of the global clock signal. The register module is configured to capture a time of a first edge of the local clock signal. The adjustment module is configured to, based on the captured time of the first edge of the local clock signal and the time of the first edge of the global clock signal, generate an adjustment signal to center a second edge of the local clock signal in the window. The blocking shaper is configured to, subsequent to adjusting the second edge of the local clock signal, block transmission of the frame from the network device based on timing of the local clock signal.

In other features, a network device is provided and includes a queue, a timing module, ports and a memory. The queue is configured to store a frame. The timing module is configured to generate a local clock signal. Each of the ports includes (i) queues, (ii) an egress module, and (iii) a respective one of queue state tables, wherein each of the queue state tables includes entries, where each of the entries includes a state of a respective one of the queues for the corresponding port, where the ports include a first port, wherein the first port includes the first queue, and where each of the egress modules is configured to cycle through the entries in a corresponding one of the queue state tables. The memory is configured to store a port table, where the port table includes delays respectively for the ports. Each of the egress modules is configured to, based on the respective delay, start cycling through the queues for the corresponding port. The egress module of the first port is configured to, based on the corresponding delay in the port table, delay from an edge of the local clock signal cycling of the entries in the corresponding one of the queue state tables. Each of the egress modules of the ports other than the first port is configured to, based on the corresponding delays in the port table, delay from an operation performed by a consecutively prior one of the ports cycling of the entries in the corresponding one of the queue state tables.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

FIG. 6 is a functional block diagram of a time-unaware blocking shaper in accordance with an aspect of the present disclosure.

FIG. 7 is a graph illustrating count values for a time-unaware blocking shaper over time in accordance with an aspect of the present disclosure.

In the drawings, reference numbers may be reused to identify similar and/or identical elements.

DESCRIPTION

Figure 1:
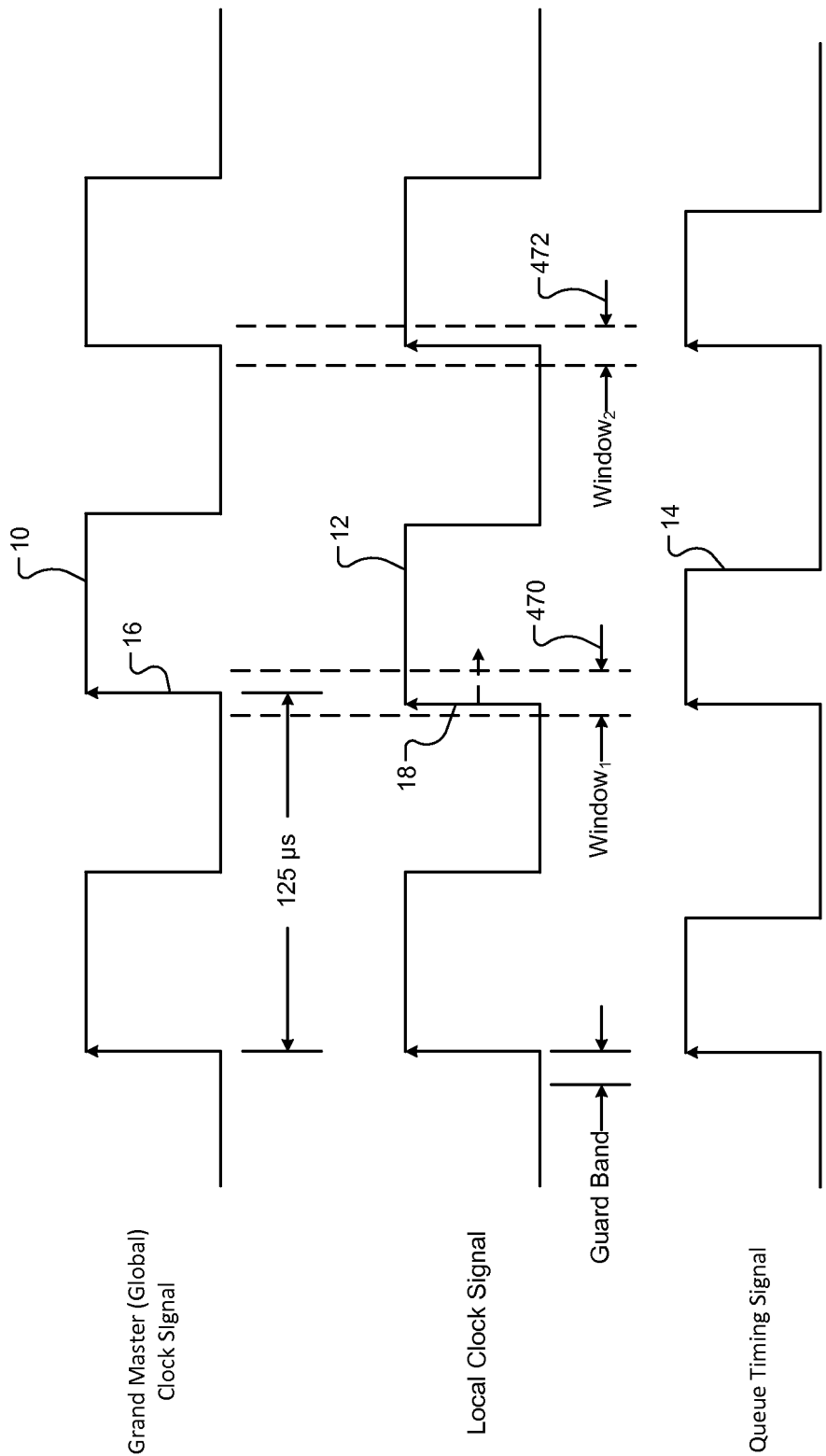
FIG. 1 is a plot of a grand master (or global) clock signal, a local clock signal and a queue timing signal in accordance with an aspect of the present disclosure.

IEEE 802.1 Qbv is a specification for a time aware shaper in AVB generation 2 network and is referred to as time sensitive networking (TSN). Time aware shapers are used for blocking passage of data from queues within a port of a network device. Time aware shapers may operate based on a precise timing protocol (PTP) time. Each time aware device (or any device that operates based on a PTP time) in a non-arbitrary network needs to be able to 'hold over' and operate when the PTP time is unavailable (or 'disappears') for a period of time. Examples of time aware blocking shapers are shown in and described below with respect to at least FIGS. 5-6 and 8-9.

To satisfy the 'hold over' function, a separate clock circuit may be provided for each time aware function and/or port of a network device. Time aware shapers are disclosed below that may determine frequency and phase of a local clock. The local clock is provided by a corresponding clock circuit (or timing module). Examples are disclosed that include maintaining constant frequencies and/or phases of respective local clocks of multiple network devices in a network. The frequencies and phases are maintained relative to a global clock signal.

The network devices in a network may have respective crystal oscillators, which generate respective local clock signals having different base frequencies. The base frequencies may be within +/−100 pulses per minute (PPM) of each other. The base frequencies can change over time due to changes in temperature. Periodic corrections are performed to account for the temperature changes. PTP protocols may be used to account for the differences in clock frequencies based on a grand master clock (sometimes referred to as a "global clock"). A grand master clock is a clock that generates a global clock signal, which is shared by network devices in a non-arbitrary network. The local and global clocks may generate analog or digital clock signals.

IEEE 802.1Qbv supports lowest possible latency from Ethernet networks. This is accomplished by preventing congestion to lowest latency data flows by blocking other data flows during time windows when critical data flows need to be sent. This congestion prevention can include "Cut-Through" operation, which supports further reduced latency by allowing a portion of a frame to be transmitted from a port prior to the whole frame being received from the port. IEEE 802.1Qbv supports Cut-Though operation by using time aware blocking (TAB) windows. TAB windows provide points of reference for when to permit passage of data and/or when to block passage of data. For a long daisy chain of switches, a same repeating TAB window may be provided for multiple ports of a network device. The TAB window may be generated based on a local clock at the corresponding network device.

The following disclosed examples, provide independent repeating TAB windows for each port of a network device to accommodate a long daisy chain of switches and other applications such as ringed networks. Ringed networks include network devices that are connected in rings to allow for data to travel to a same network device in multiple directions. The TAB windows may be generated based on a same local clock and may all have a same period, but opening and closing (or start and end) times of the TAB windows are independent port to port as well as queue to queue for a same port.

To maximize Cut-Through operation, if critical (or Cut-Through) data is ready to be transmitted at regular time intervals then low latency of Cut-Through can be assured if other data and/or queues of a port are blocked off during a period of time when the Cut-Through data is being transmitted from the port. This requires bridges (or switches) to block all other traffic during a Cut-Through window. This function may be performed by a time aware blocking scheduler (or timing module).

FIG. 1 shows a grand master (or global) clock signal 10, a local clock signal 12 and a queue timing signal 14. Each cycle (or periodic transmission timing interval) of the grand master clock signal 10 and the local clock signal 12 may have a length of, for example, 125 micro-second (μs) for an 8 kilo-hertz (kHz) signal. A maximum number of frames that may be transmitted during each of the periodic transmission time intervals may be, for example, eight.

The local clock signal 12 may be synchronized with the global clock signal 10 or may be off in time from the global clock signal, as shown by pulses 16, 18. One or more ports of a network device may operate based on the local clock signal 12. The queue timing signal 14 may refer to transmission timing of critical data from a queue of a port of the network device. The port may transmit the critical data starting at rising edges of the local clock signal 12. In order to prevent interference with the transmission of the critical data from the queue, all other queues of the port may be blocked from transmitting starting a predetermined period prior to the rising edge of the local clock signal. This predetermined period is shown and referred to as a guard band. The stated blocking assures that the port is idle when the rising edge of the local clock signal 12 occurs and transmission of the critical data occurs without interference.

Figure 2:
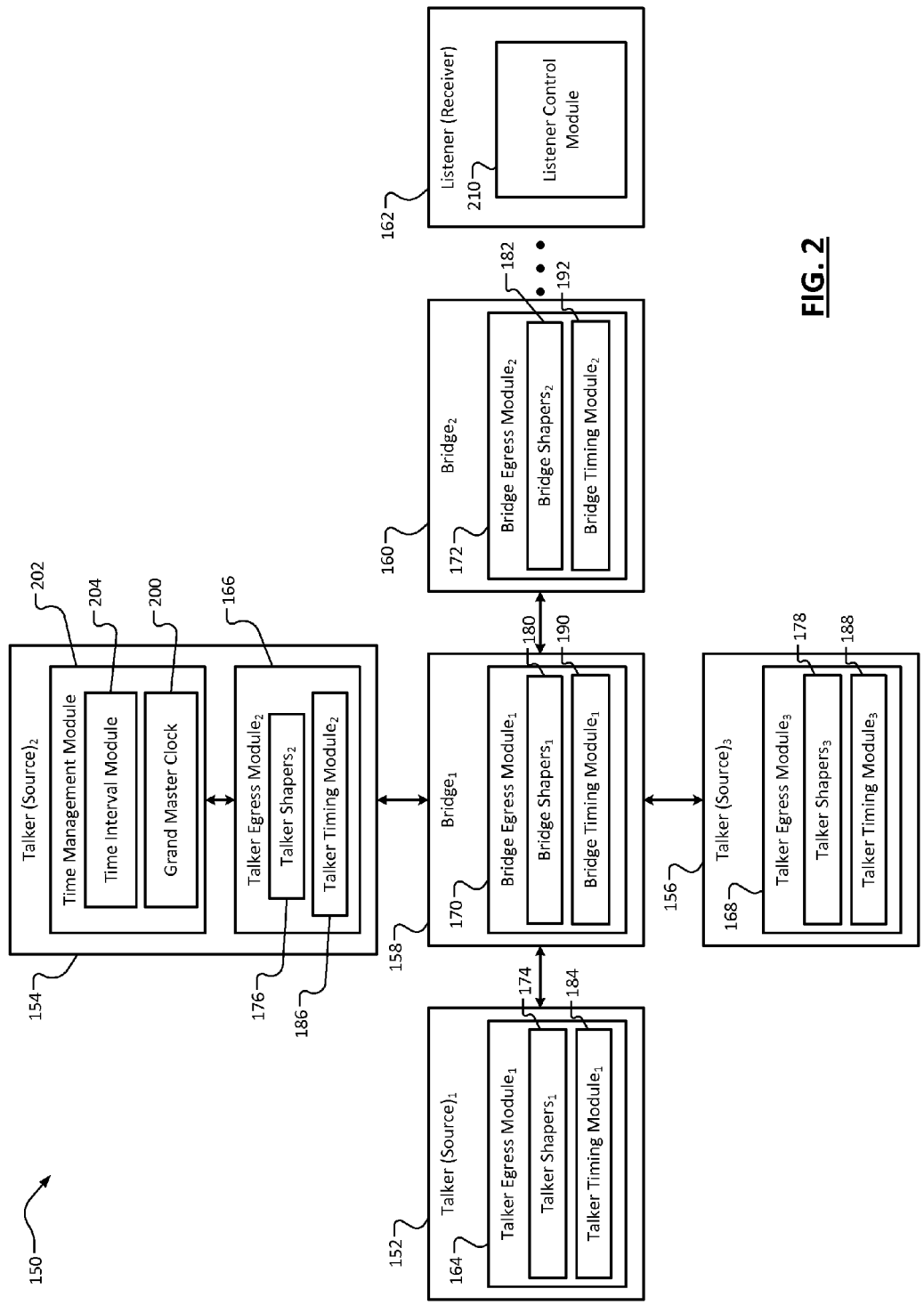
FIG. 2 is a functional block diagram of a non-arbitrary network in accordance with an aspect of the present disclosure.
Figure 10:
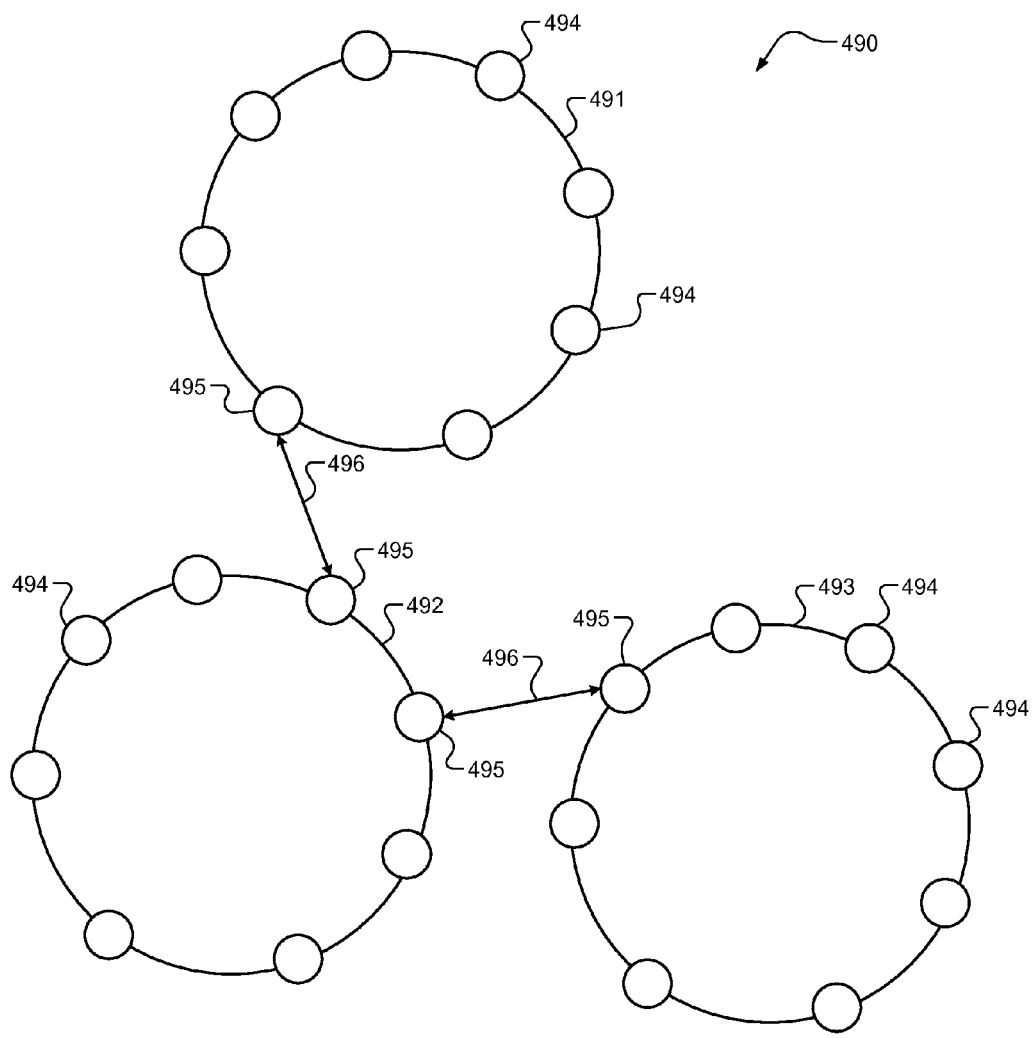
FIG. 10 is a diagram of a ring network in accordance with an aspect of the present disclosure.

In a linear network (e.g., a network having network devices connected in series) or ringed network (e.g., a network having network devices connected in a ring) and over extended periods of time, local clocks of the network devices may become unsynchronized with a global clock. An example of a linear network is shown in FIG. 2. An example of a ring network is shown in FIG. 10. For example, rising and/or falling edges of the local clocks may occur at difference times than rising and falling edges of the global clock. The local clocks may have respective time delays (or phase differences) relative to the global clock. The time delays may vary and/or increase over time. Each of the network devices may have a respective local oscillator. Local clock signals generated by the local oscillators can become unsynchronized with a global clock signal and/or the differences in phase can vary and/or increase due to: manufacturing differences in the local oscillators; differences in operating temperatures of the local oscillators and/or network devices; and/or jitter. The differences can accumulate over time. The below disclosed examples maintain synchronization and/or phase differences between a global clock and local clocks. Examples are provided for locking local clock signals of multiple ports of a network device to a global clock signal. Timing modules (or time applications interfaces (TAIs)) are provided that adjust local clock frequencies to account for PPM differences between a global clock and local clocks. The local clock frequencies may be adjusted in predetermined increments (e.g., in pico-second increments or other increments).

The disclosed examples also determine network device (or station) delays relative to and/or based on a global clock and port delays relative to and/or based on a local clock. Each of the network devices may have a table of scheduled port transmission times, durations and/or delays. The table may identify port states and respective delays. In one embodiment, the tables do not include durations, but rather include consecutive relative delays. Each port may have a different delay period. An example port delay period is expressed by equation 1 below. Each delay period may refer to and/or be based on a respective amount of delay from a global clock signal and/or a respective delay from a certain operation of a first port until performing a certain operation at next consecutive (or second) port. The certain operations may be resetting and/or restarting cycling through entries in corresponding Qbv tables of queue states for each of the ports. Each delay period may refer to and/or be based on a delay between activation and/or initialization of a first port and activation and/or initialization of a next consecutive port. Each delay period may alternatively refer to and/or be based on an amount of delay between (i) when a first port begins or ends transmission of data and (ii) when a next (or second) consecutive port begins transmission of data. This allows (i) a local clock to be independently adjusted without altering the delays of the ports and/or state durations of queues within a port, and (ii) the timing of all of the ports to be directly or indirectly adjusted relative to a global clock. A frequency of the local clock can be adjusted to any arbitrary frequency.

The examples further allow for soft-blocking to utilize guard band periods for non-critical data (or data that is not of highest priority). Hard-blocking refers to blocking all queues that are not of highest priority for at least a portion of a guard band to allow transmission of data from a highest priority queue (or next queue scheduled to transmit data at an end of a guard band). Soft-blocking includes: determining the size of a frame and/or packet; determining whether there is enough remaining time prior to transmission of a critical data to transmit the frame and/or packet; and permitting transmission of the frame and/or packet prior to transmitting the critical data. The critical data may include, for example, Class A data or other data. Class A data may refer to data with a highest priority level for GE. If the frame or packet is too large and/or cannot be transmitted prior to the scheduled transmission of the critical data, then the frame and/or packet is blocked. For example, if the length of the guard band and/or a remaining portion of the guard band is less than needed to transmit the frame and/or packet, then the frame and/or packet is blocked. This determination may be made based on the size (or number of bytes) of the frame and/or packet and a size (or length) of the guard band in bytes.

Performing soft-blocking based on size provides a more accurate and reliable technique than a purely time-based approach. For example, if determining whether to transmit a frame and/or a packet, transmission time may be determined in nanoseconds. Transmission of the frame and/or the packet may be less than 1 nanosecond shorter or longer than a remaining portion of a guard band interval. As a result the frame and/or packet may be unduly blocked when shorter than the remaining portion of the guard band interval or wrongfully transmitted during transmission of other data.

In FIG. 2, a non-arbitrary network 150 is shown. The non-arbitrary network 150 is a linear network and includes one or more talkers (three talkers 152, 154, 156 are shown), one or more bridges (two bridges 158, 160 are shown) and a listener 162. The talkers 152, 154, 156 may be referred to as a source, as the talkers transmit data to the listener 162. The listener 162 may be referred to as a receiver, as the listener 162 receives data from the talkers 152, 154, 156. The talkers 152, 154, 156 and bridges 158, 160 may each include respective egress modules 164, 166, 168, 170, 172. The bridges 158, 160 may satisfy IEEE 802.1 AS, which provides precise timing protocols (PTPs). The bridges 158, 160 provide a daisy chain of network devices between end stations (e.g., the talkers 152, 154, 156 and the listener 162). Each of the egress modules 164, 166, 168, 170, 172 may include respective shapers 174, 176, 178, 180, 182 and/or timing modules 184, 186, 188, 190, 192.

The shapers 174, 176, 178, 180, 182 may include blocking shapers. The blocking shapers may include time-unaware blocking shapers and time-aware blocking shapers (TABSs). Examples of time-unaware blocking shapers and time-aware blocking shapers are shown in FIGS. 5-6 and 8-9. The time-aware blocking shapers operate based on a global clock signal generated by a grand master clock 200. The grand master clock 200 may be located in any of the network devices of the network 150. The global clock signal may be shared with any of the network devices in the network 150. As an example, the grand master clock 200 is shown in the second talker 154, but may be located in one of the other talkers 152, 156, one of the bridges 158, 160, the listener 162, or other network device connected to the network 150.

The time-aware blocking shapers may delay a transmission start of non-highest priority data (e.g., non-Class A data or Class B data and/or non-AVB data). This delay may be performed based on transmission timing of the highest priority data (e.g., Class A data). Transmission timing of the Class A and non-Class A data may be provided by the timing modules 184, 186, 188, 190, 192, which may generate priority timing signals or queue state output signals. Each priority timing signal and/or or queue state output signal may indicate a window in which corresponding data is permitted or not permitted to be transmitted. The priority timing signals and/or or queue state output signals generated for non-Class A data (or Class B data and/or unprotected data) may be generated based on an allocated time period in each periodic transmission time interval. The highest priority data (Class A data) is transmitted in each of the allocated time periods. This insures that an output of an egress module is idle such that Class A bursts are not interfered with by transmission of other data (non-highest priority data).

The network device that includes the grand master clock 200 or one of the other network devices in the network 150 may include a time management module 202. The network device having the grand master clock 200 and/or the time management module 202 may be referred to as a master device. Devices not having the grand master clock 200 and/or the time management module 202 may be referred to as slave devices. The time management module 202 may include the grand master clock 200 and/or a time interval module 204. The time interval module 204 may set the periodic transmission time interval (i.e. duration of the periodic transmission time interval) and start times $t_0$ of each of the periodic transmission time intervals. The global clock signal, the periodic transmission time interval and the start times $t_0$ of the periodic transmission time intervals may be shared between the network devices using a management information base (MIB) modules and/or a simple management network protocols (SMNPs).

The bridge (e.g., the bridge 158) closest to the talker (e.g., talker 152) may perform as a time translator device. A time translator device may be incorporated between a talker without time-aware blocking shaper(s) and a bridge with time-aware blocking shaper(s). The bridge may have a single input port and a single output port or two of the ports of the bridge may be enabled while other ports of the bridge are disabled. An egress module of the bridge may enable and disable the ports. This may be based on contents of a port table, where the port table includes entries with corresponding delays, as disclosed herein. While operating as a time translator device, the bridge has a single input port enabled and a single output port enabled. Also, while operating as a time translator device (referred to as operating in a time translator mode), the bridge performs time-aware blocking of non-Class A frames to adjust transmission timing of Class A frames and/or non-Class A frames.

The listener 162 receives data from the talkers 152, 154, 156 via the bridges 158, 160. The listener 162 may include a listener control module 210. The listener control module 210 may operate and/or monitor or operate one or more sensors, motors, actuators, or other devices of the network based on the data received from the talkers 152, 154, 156.

The talkers 152, 154, 156, bridges 158, 160, and/or listener 162 may communicate with each other via wired or wireless connections and/or mediums. The wireless connections and/or mediums may satisfy, for example, IEEE standards 802.11, 802.11a, 802.11b, 802.11g, 802.11h, 802.11n, 802.16, and 802.20.

Figure 3:
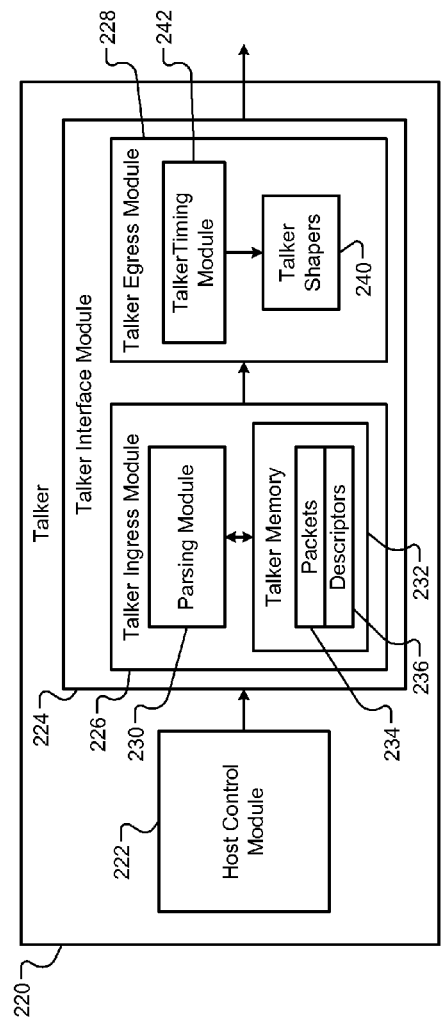
FIG. 3 is a functional block diagram of a talker in accordance with an aspect of the present disclosure.

In FIG. 3, an example of one of the talkers 152, 154, 156 (designated 220) of the network of FIG. 2 is shown. The talker 220 includes a host control module 222 and an interface module 224. The host control module 222 may include, for example, a processor and provide data of different priority levels to the interface module 224. The data may include Class A data, Class B data, and non-AVB data. The interface module 224 may be, for example, a network interface card or other suitable interface. The interface module 224 includes a talker ingress module 226 and a talker egress module 228.

The talker ingress module 226 may, include, for example, a talker parsing module 230 and talker memory 232. The talker parsing module 230 may receive packets 234 of data from the host control module 222, parse the packets 234, and generate descriptors 236 based on headers provided in frames of the packets 234. Each of the headers and/or descriptors 236 may include a size of a corresponding packet and/or frame, a start time of a periodic transmission time interval, a length of the periodic transmission time interval, and/or source and/or destination addresses. Each packet received may include a predetermined number of frames of data. The packets 234 and the descriptors 236 may be stored in the talker memory 232 and provided in a descriptor signal to the talker egress module 228.

The talker egress module 228 includes talker shapers 240 (e.g., the talker shapers 174, 176, 178 of FIG. 2) and a talker timing module 242 (e.g., one of the talker timing modules 184, 186, 188 of FIG. 2). The talker shapers 240 operate based on priority timing signals and/or or queue state output signals from the talker timing module 242. The talker ingress module 226 and/or the talker egress module 228 may include a media access controller (MAC).

Figure 4:
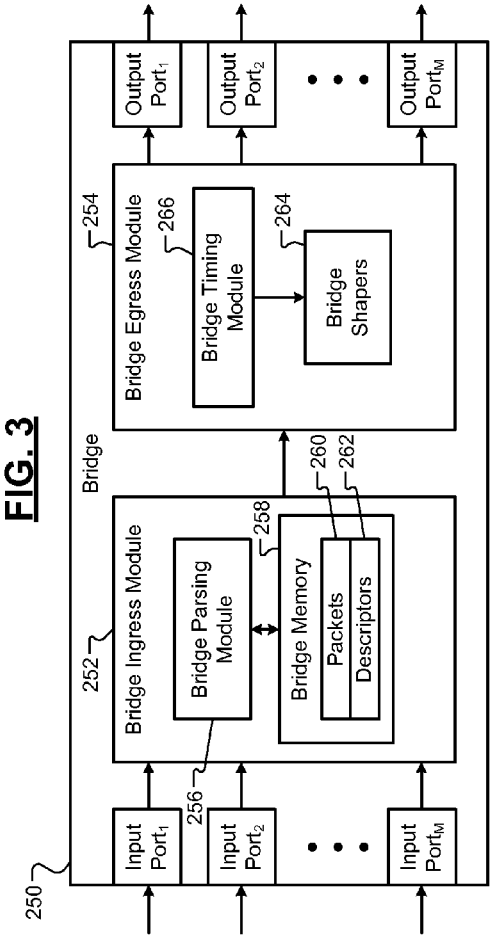
FIG. 4 is a functional block diagram of a bridge in accordance with an aspect of the present disclosure.

In FIG. 4, an example of one of the bridges 158, 160 (designated 250) of FIG. 2 is shown. The bridge 250 includes input ports$_{1-N}$, a bridge ingress module 252, a bridge egress module 254 and output ports$_{1-M}$. Although the ports N, M are labeled as input ports and output ports, each of the ports N, M may perform as an input port and/or an output port. Also, each of the ports N, M may be connected to the bridge ingress module 252 and/or the bridge egress module 254. In addition, the bridge 250 may include any number of input ports and output ports.

The bridge ingress module 252 includes a bridge parsing module 256 and a bridge memory 258. The bridge parsing module 256 may receive data from a talker, a bridge, and/or a time translator device. The bridge parsing module 256 may parse packets 260 received and generate descriptors 262 based on headers provided in frames of the packets 260. Each of the descriptors 262 may include a size of a corresponding packet and/or frame, a start time of a periodic transmission time interval, a length of the periodic transmission time interval, and/or source and/or destination addresses. Each packet received may include a predetermined number of frames of data. The packets 260 and the descriptors 262 may be stored in the bridge memory 258 and provided in a descriptor signal to the bridge egress module 254. The bridge egress module 254 includes bridge shapers 264 (e.g., bridge shapers 180, 182 of FIG. 2) and a bridge timing module 266 (e.g., one of bridge timing modules 190, 192 of FIG. 2). The bridge shapers 264 operate based on priority timing signals and/or or queue state output signals from the bridge timing module 266. The bridge ingress module 252 and/or the bridge egress module 254 may include a MAC.

Figure 5:
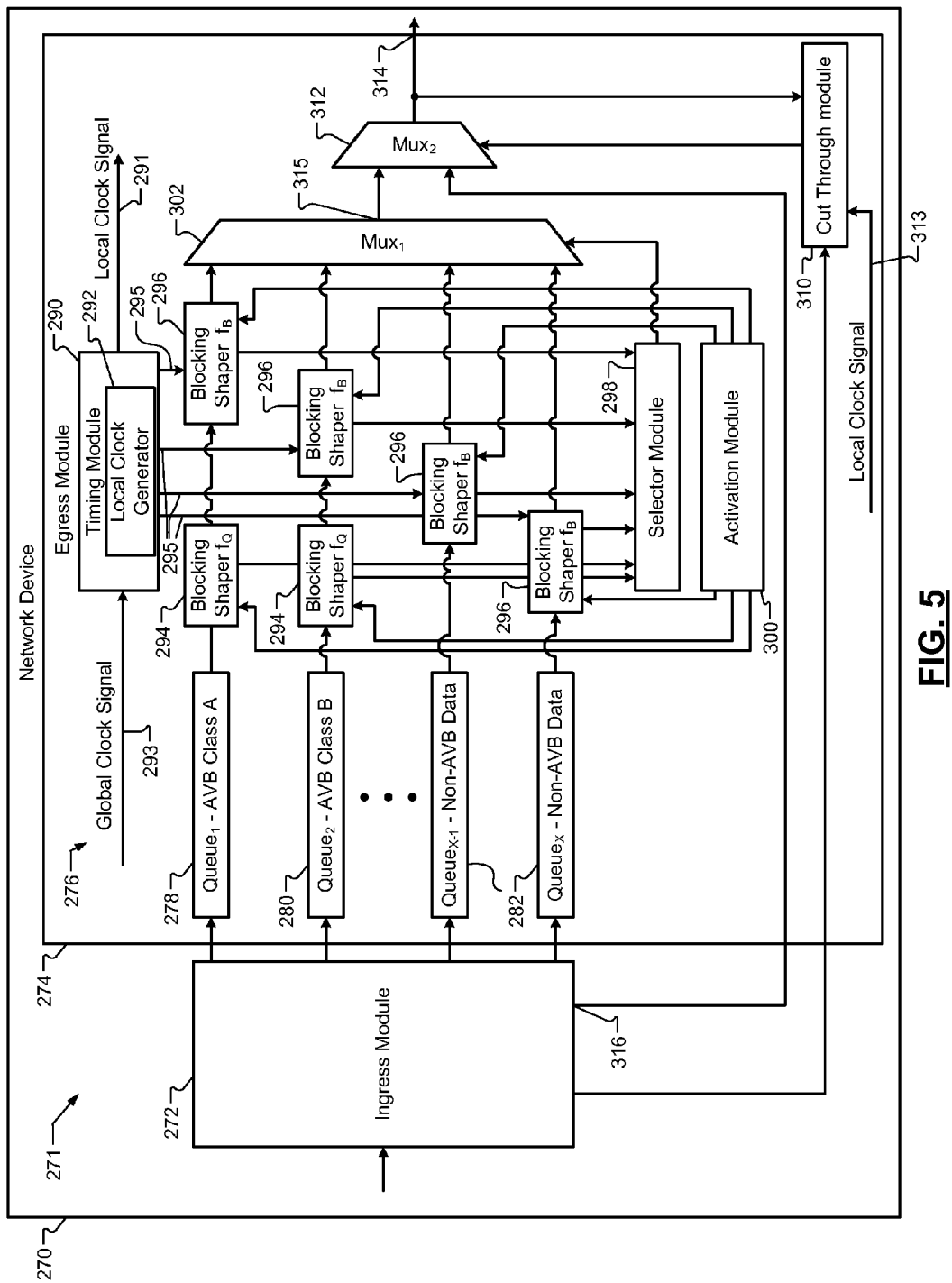
FIG. 5 is a functional block diagram of a network device in accordance with an aspect of the present disclosure.

In FIG. 5, a network device 270 is shown. The network device 270 includes a data blocking system 271 with an ingress module 272 and an egress module 274 with an egress network 276. Each of the talkers 152, 154, 156 and bridges 158, 160 of the network 150 of FIG. 2 may be replaced with the network device 270 and/or include the ingress module 272 and/or the egress module 274. The network device 270 may operate as a talker, a bridge and a time translator device and as such has a talker mode, a bridge mode, and time translator mode.

The ingress module 272 receives frames of data (hereinafter referred to as frames) from: a host control module of a talker; a bridge; and/or a time translator device. The ingress module 272 parses the frames and provides the frames to a respective queue of the egress module 274. The egress network 276 may be associated with a single output port (e.g., one of the output ports M of FIG. 4). The egress module 274 may include a similar egress network for other output ports. The egress network 276 includes queues$_{1-X}$ having respective priority levels. The egress network 276 may include any number of queues for each priority level. As an example, the egress module 274 may include one or more Class A queues 278 that receive Class A data, one or more Class B queues 280 that receive Class B data, and one or more non-AVB queues 282 that receive non-AVB data. Each of the queues$_{1-X}$ may perform as a register and store frames of a respective priority level. The egress module 274 may cycle through entries in a Qbv queue table for the corresponding port. The entries may include queue states and respective durations and/or delays, as further described below.

The egress network 276 also includes a timing module 290, time-unaware blocking shapers 294 (shown in FIG. 5 as blocking shapers $f_O$), time-aware blocking shapers 296 (TABSs, shown in FIG. 5 as blocking shapers $f_B$), a selector module 298, an activation module 300, and a first multiplexer 302. The time-unaware blocking shapers 294 and the time-aware blocking shapers 296 may be referred to individually as a blocking shaper and/or collectively as blocking shapers. Each of the the blocking shapers 294, 296 may be referred to as a shaper module.

Figure 8:
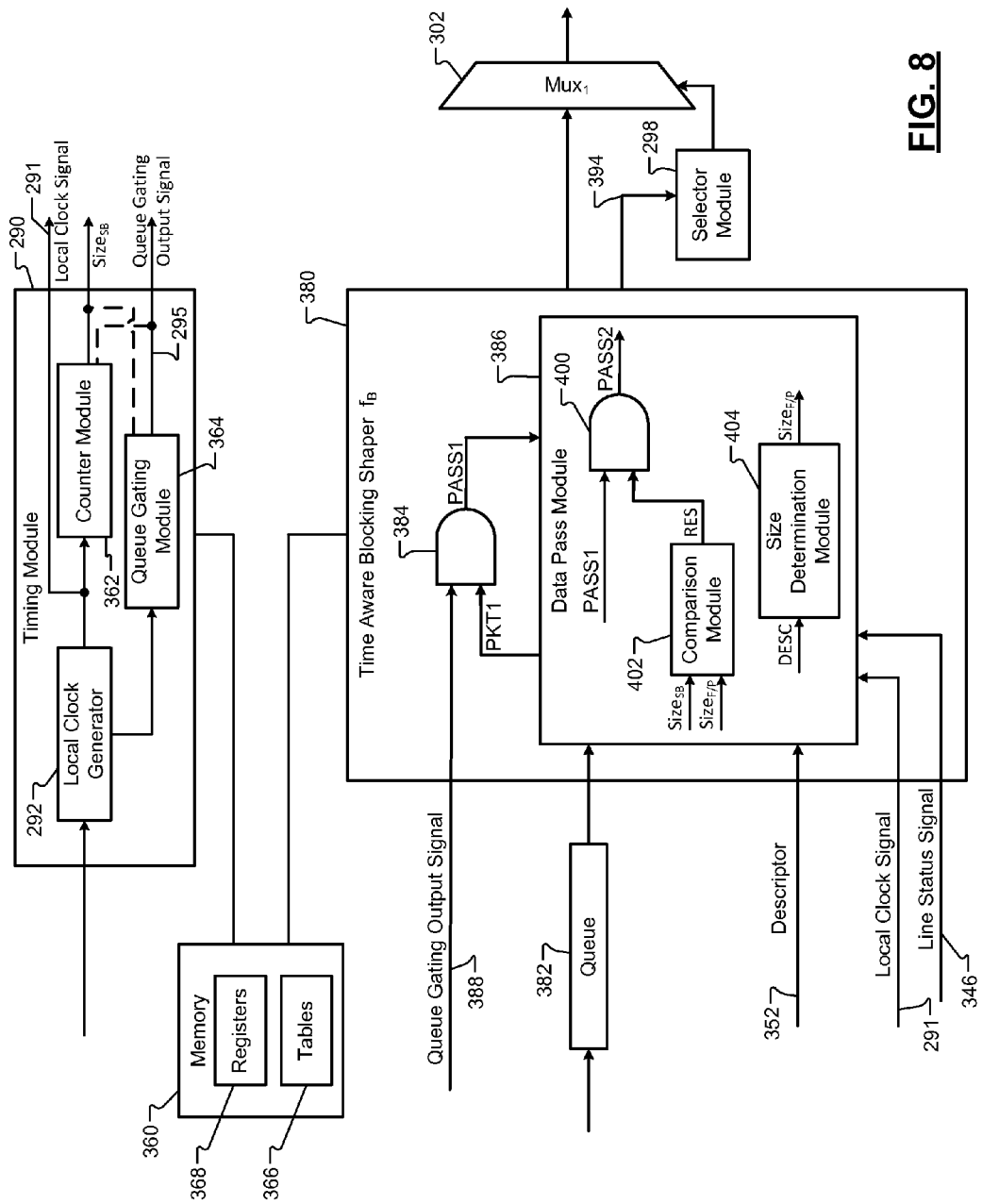
FIG. 8 is a functional block diagram of a time-aware blocking shaper in accordance with an aspect of the present disclosure.

The timing module 290 includes a local clock generator 292 that generates a local clock signal 291 based on a global clock signal 293. The timing module 290 may also generate queue gating output signals 295, which are provided to each of the time-aware blocking shapers 296. Each of the queue gating output signals 295 provides a queue status bit indicating whether data is permitted to pass from a queue or whether the queue is blocked. This may be based on a time window (or duration) and/or a delay period in which the time-aware blocking shapers 296 are to either permit data passage or block data from being selected by the selector module 298 for a corresponding queue. The time window, duration and/or delay may be stored in a table, an example of which is shown in FIG. 8. The queue gating output signals 295 generated for the time-aware blocking shapers 296 may indicate when the time-aware blocking shapers 296 are to block data in the Class A queues, Class B queues and the non-AVB queues. The time-aware blocking shapers 296 receive respective queue gating output signals 295.

The network device 270 may include any number of blocking shapers. The number of blocking shapers may depend upon the number of Class A queues, Class B queues, and non-AVB queues. The blocking shapers and corresponding transmission paths provide a lowest level of latency as interference from other transmission paths with a lower priority level is prevented.

The time-aware blocking shapers 296 may be used to assure that data is transmitted from, for example, a talker and/or a time translator device at appropriate times. When operating in the talker mode, the network device 270 may load up Class A frames in the Class A queue 278 prior to a Class A burst. The Class A burst includes forwarding Class A frames from the Class A queue 278 and transmitting the Class A frames from the network device 270 for a predetermined period within a periodic transmission time interval. The time-aware blocking shapers 296 control when the Class A burst starts and further control transmit timing of the Class A frames during the Class A burst. During the Class A burst, the time-aware blocking shapers 296 block transmission of non-Class A frames (e.g., Class B frames or non-AVB data) causing the non-Class A queues to be idle.

The Class A queues 278 and Class B queues 280 may each have a corresponding time-unaware blocking shaper (e.g., one of the time-unaware blocking shapers 294). The Class A queues 278, Class B queues 280 and non-AVB queues 282 may each have a corresponding time-aware blocking shaper (e.g., one of the time-aware blocking shapers 296). The time-unaware blocking shapers 294 are connected in series with a respective one of the blocking shapers 296 and time-aware blocking shapers 296. The time-unaware blocking shapers 294 are used to pace transmission of frames and may satisfy IEEE 802.1 Qav. The time-aware blocking shapers 296 block the selector module 298 from selecting frames in certain ones of the Class A queues 278, Class B queues 280 and in the non-AVB queues 282 during transmission periods of one or more other ones of the queues 278, 280, 282. This prevents interference of frames and minimizes latency.

The time-unaware blocking shapers 294 may operate in parallel with the blocking shapers 296 relative to the selector module 298. For example, Class A data may pass from a Class A queue 278 to the first multiplexer 302 based on one of the blocking shapers 296 and the corresponding one of the time-unaware blocking shapers 294. Class B data may pass from Class B queues 280 to the first multiplexer 302 based on the corresponding ones of the time-unaware blocking shapers 294 and time-aware blocking shapers 296.

Each of the queues$_{1-X}$ and blocking shapers 294, 296 has an associated transmission path. Each transmission path includes a respective one of the queues$_{1-X}$ and may include one or more of the blocking shapers 294, 296. The blocking shapers 294, 296 generate respective blocking signals. The blocking signals are received by the selector module 298 and indicate when a frame is in a corresponding queue and is ready to be forwarded to the first multiplexer 302.

A frame may be in a queue and a corresponding blocking signal may indicate that there is not a frame in the queue and/or that the frame is not ready to be selected. The blocking signal may indicate that there is not a frame and/or that the frame is not ready to be transmitted based on a corresponding queue gating output signal. This blocks the transmission of frames at inappropriate times. As an example, one of the time-aware blocking shapers 296 may generate a blocking signal when a Class B frame is in the Class B queue 280. The blocking signal may indicate that a Class B frame is not in the Class B queue 280, thereby blocking the selector module 298 from selecting the Class B frame prior to and/or during, for example, a transmission period of a Class A frame. This prevents transmission interference with the Class A frame.

The selector module 298 generates a select signal, which is received by the first multiplexer 302 to select frames from the queues$_{1-X}$. The selector module 298 may be a strict style selector. A strict style selector permits all frames in a highest priority level queue that has frames to be transmitted before permitting transmission of frames from a next highest priority level queue. This occurs when the strict selector is directly monitoring states of the queues including determining whether frames are in the queues.

In the following implementations, instead of the selector module 298 directly monitoring states of the queues$_{1-X}$, the selector module 298 monitors blocking signals received from the blocking shapers 294, 296. The selector module 298 then generates the select signal to permit passing of a frame from a queue based on blocking signals. The blocking shapers 294, 296 prevent the selector module 298 from directly "seeing" frames that are in the queues$_{1-X}$.

The activation module 300 enables and disables the blocking shapers 294, 296 based on the operating mode of the network device 270. For example, when operating in the talker mode and/or the time translator mode, one or more of the blocking shapers 294, 296 may be disabled. Time-unaware blocking shapers 294 may be disabled to reduce latency of Class A frames. One or more of the remaining time-aware blocking shapers 296 may be enabled. In one implementation, the time-aware blocking shapers 296 are disabled. As another example, when operating in the bridge mode, one or more of the blocking shapers 294, 296 may be enabled.

As another example, if the network device 270 is used in a pro-audio environment, the time-unaware blocking shapers 294 may be enabled. As yet another example, in an automotive environment when Class A frames are transmitted, the time-unaware blocking shapers 294 may be disabled and one of the blocking shapers 296 may be disabled. This reduces latency of the Class A frames and further allows for predetermined bandwidth and maximum frame latency requirements to be satisfied.

When operating in the time translator mode, the network device 270 may be connected to an output of a talker. The network device 270 may be configured as a time translator device and incorporated at an output of a time-unaware talker and prevent blocking and adjust transmission timing of Class A frames. The network device 270 may enable a single input port and a single output port while disabling other ports. This may be performed when the talker does not include time-aware blocking shapers to assure that Class A frames are transmitted at the appropriate times. Transmitting Class A frames at appropriate times includes: initiating transmission of Class A frames at predetermined start time (s) $t_0$ of periodic transmission time intervals of the local clock signal 291; and transmission of Class A frames at appropriate times during predetermined Class A burst windows of the periodic transmission time intervals.

The egress module 274 may also operate in a cut-through mode and include a cut-through module 310 and a second multiplexer 312. The cut-through module 310 and the second multiplexer 312 are used to further minimize latency of highest priority frames (e.g., Class A frames). The cut-through module 310 may be time-aware by receiving and operating based on the local clock signal 291. The cut-through module 310 may be referred to as a time-aware cut-through shaper (TACS).

The cut-through module 310 monitors activity at an output 314 (e.g., an output port) of the network device 270 and permits Class A frames or other frames to pass from the ingress module 272 to the second multiplexer 312 bypassing the corresponding queues, the corresponding blocking shapers and/or time-unaware blocking shapers, and the first multiplexer 302. The cut-through module 310 may permit transmission of a portion of a frame and/or packet from the second multiplexer 312 prior to reception of the whole frame and/or packet at the ingress module 272. The activity at the output 314 may be directly monitored as shown or the cut-through module 310 may receive a line activity signal generated by the selector module 298 and/or the egress module 274. The line activity signal may indicate whether there is data transmission activity at the output.

The cut-through module 310 generates a second select signal to select one of an output 315 of the first multiplexer 302 and a data output 316 of the ingress module 272. The second multiplexer 312 receives the second select signal and forwards Class A frames (or other frames) from either the output 315 or the output 316 based on the second select signal. Transmission of Class A frames from the output 316 may be referred to as type 3 data transmission.

The bypassing performed by the cut-through module 310 may occur prior to the ingress module 272 receiving all frames of transmitted packets and/or prior to receiving all bits of a frame. After a predetermined number of bytes (e.g., 64 bytes) of data have been received by the ingress module, the bytes may be passed from the ingress module 272 to the second multiplexer 312. The predetermined number of bytes may be associated with, for example, header data. The header data may include source and target addresses, frame size, data type, and/or other packet and/or frame information.

Since the time-aware blocking shapers 296 block non-Class A frames of data during Class A bursts, the output 314 is idle and the Class A frames may be passed directly to the output 314 via the second multiplexer 312. This eliminates latencies associated with storing the frames in the Class A queue 278 and corresponding blocking shapers.

If the cut-through module 310 is enabled and used to bypass Class A frames, a maximum latency for the Class A frames for a bridge is equal to time delay of the bridge $t_{Bridge}$ plus time delay associated with a cut-through point (e.g., the second multiplexer) $t_{Cut}$ plus a cable maximum transmission time $t_{Cable}$. As an example, with a bridge delay of two slot times (or 1.024 µs) and a cut-through delay time of one slot time (0.512 µs), a maximum latency may be 2.074 µs when the maximum cable transmission time $t_{Cable}$ is 0.538 µs. This latency is provided regardless of the size of the Class A frames being transmitted, as Class A bits are transmitted from the bridge prior to all Class A bits being received by the bridge and/or as the Class A bits are outputted from the ingress module 272. The latency associated with type 3 transmissions is less than the latency associated with type 1 (e.g., 13.898 μs) and type 2 (e.g., 4.122 μs) transmissions.

The cut-through module 310 may signal the ingress module 272 to bypass the Class A frames to the second multiplexer 312 instead of providing the Class A frames to the Class A queue(s). The cut-through module 310 may be incorporated in the ingress module 272 instead of being in the egress module 274, as shown.

Referring now also to FIG. 6, a time-unaware blocking shaper 320 is shown. The time-unaware blocking shaper 320 may replace any one of the time-unaware blocking shapers 294 of FIG. 5. The time-unaware blocking shaper 320 may not operate based on a global clock signal. In one embodiment, the time-unaware blocking shaper 320 does operate based on a local clock 321. The local clock 321 may generate a clock signal that is independent of a global clock signal. The clock signal may also be independent of a local clock signal, as generated by the local clock generator 292 of FIG. 5. The time-unaware blocking shaper 320 spreads out frames of data prior to transmission and prevents the selector module 298 from "seeing" frames in the queues 278, 280 with protected data. This includes providing IFGs between each pair of sequential frames of data.

The time-unaware blocking shaper 320 includes a first counter 322 and a queue monitoring module 324. The first counter 322 counts credits for a queue 326 (e.g., one of the queues 278, 280) being monitored. The queue monitoring module 324 monitors whether there is a frame in the queue 326 and increments the first counter 322 when a frame is in the queue 326 and is not permitted to pass from the queue 326 to the first multiplexer 302. The queue monitoring module 324 decrements the first counter 322 when a frame is passed to the first multiplexer 302. The first counter 322 may have a high limit maximizing a first count associated with the queue 326. The first counter 322 may also have a low limit minimizing the first count associated with the queue 326.

Referring now also to FIG. 7 a graph 330 illustrating count values for the time-unaware blocking shaper 320 over time is shown. Increments of the first count when a frame is not permitted to pass from the queue to the first multiplexer 302 is represented by a first line segment 332. The frame may not be permitted to pass due to interference (i.e. frame(s) in one or more other queues$_{1-X}$ being transmitted). The first count then reaches a high limit 334 and is maintained at a current count value. Frames are then permitted to pass to the first multiplexer 302 and the first count is decremented, as represented by a first vertical line segment 336. The first count may then again be incremented when frames are not passed from the queue 326 to the first multiplexer 302, as represented by a line segment 338.

The first count may be reset to zero when there are no frames in the queue, as represented by a line segment 340. When a frame arrives in the queue 326 and is transmitted subsequent to the first count being at zero and there is not interference, the first count may be decremented to the low limit 342. The count may be increased to zero when there is no frames in the queue to transmit, represented by line segment 344. The above-described incrementing and decrementing may be based on the local clock 321, predetermined time intervals, and/or the line status signal (designated 346).

The line status signal 346 may indicate whether data is being transmitted from the egress module 274. The line status signal 346 may indicate an output of the first multiplexer 302, an output of the second multiplexer 312, and/or may be generated by the selector module 298 and/or the egress module 274.

The queue monitoring module 324 generates a first blocking signal 350 based on the first count of the first counter 322. The first blocking signal 350 may be generated based on a descriptor signal 352 from the ingress module 272. The descriptor signal 352 may indicate when there is a frame in the queue 326 and the size of the frame (or head-of-line frame). Data is passed from the queue 326 through the queue monitoring module 324 to a corresponding time-aware blocking shaper (designated 354) followed by the first multiplexer 302.

Referring to FIGS. 5 and 8, the timing module 290, a memory 360, and a time-aware blocking shaper 380 is shown. Although the timing module 290 is shown in FIG. 8 relative to a single time-aware blocking shaper, the timing module 290 may operate and/or provide signals to any number of time-aware blocking shapers. The timing module 290 includes the local clock generator 292, a counter module 362 and a queue gating module 364. The counter module 362 monitors the local clock signal 291 and may monitor an output of the queue gating module 364 to determine size and/or remaining durations of one or more guard bands for a next scheduled queue. The size and/or remaining durations may be determined in time (e.g., nanoseconds or picoseconds) and/or may be determined in, for example, bits and/or bytes. In one embodiment, the size and/or remaining duration is determined in time and then converted to a number of bits and/or bytes. The counter module 362 outputs a softblock signal Size$_{SB}$ to indicate the size and/or remaining duration. The queue gating module 364 generates a queue gating output signal, as described above. The queue gating output signal may be generated based on the local clock signal 291 and information in a queue table, which is one of multiple tables 366 stored in the memory 360. The queue table may be referred to as a Qbv table. The information may include states of multiple queues and corresponding durations and/or delays for each of the queues of a port. A port may cycle through the queues in an order listed in the queue table. As explained in further detail below, the tables may also include a port table that includes a list of ports of a network device. The port table may include states of ports of a network device and respective delays of the ports relative to a local clock signal and/or relative to each other, as described above. The memory 360 may also include registers 368, which store parameters that are used by the timing module 290, the time-aware block shaper 380 and/or one or more modules of the timing module 290 and the time-aware block shaper 380. The registers 368 are further described below.

The time-aware blocking shaper 380 may replace any one of the time-aware blocking shapers 296 of FIG. 5. The time-aware blocking shaper 380 blocks data in a corresponding queue 382 (e.g., one of the queues 280, 282) while Class A data is forwarded to the first multiplexer 302 and/or transmitted out of the network device 270. The time-aware blocking shaper 380 includes a first logic module 384 and a data pass module 386.

The logic module 384 receives one of the queue gating output signals of FIG. 5 (designated 388) and a frame signal PK1. The queue gating output signal may include information in a Qbv table stored in the memory 360. In one implementation, the queue gating output signal includes a queue state bit indicating whether a corresponding queue is scheduled to transmit according to the Qbv table for a given point in time. The frame signal PKT1 may be generated by the data pass module 386 and indicate when there is a frame in the queue 382. The logic module 384 may include an AND gate as shown and/or other suitable logic devices. Inputs of the AND gate may receive the queue gating output signal 388 and frame signal PKT1. The logic module 384 generates a first pass signal PASS1.

The data pass module 386 includes a second logic module 400, a comparison module 402 and a size determination module 404. The size determination module 404 determines size of a next frame and/or packet based on the descriptor signal 352. The descriptor signal 352 may indicate the size of the next frame and/or packet in the queue 382. The size is represented by signal $Size_{F/P}$. The comparison module 402 compares the signals $Size_{SB}$ and $Size_{F/B}$ and generates a resultant signal RES. The resultant signal RES indicates whether the size of the frame and/or packet is smaller than or equal to the size indicated by the soft-block signal $Size_{SB}$. The resultant signal RES indicates whether the frame and/or packet is able to be transmitted during a guard band interval and/or remaining portion of the guard band interval.

The second logic module 400 may include a second AND gate as shown and/or other suitable logic devices. The second AND gate includes inputs that receive the first pass signal PASS1 and the resultant signal RES. The second AND gate generates a second pass signal PASS 2. The data pass module 386 generates a second blocking signal 394 based on the second pass signal PASS2 and may generate the second blocking signal 394 based on the local clock signal 291, the descriptor signal 352 and/or the line status signal 346. The data pass module 402 permits head-of-line frames to pass to the first multiplier 302 based on sizes of the head-of-line frames and time remaining before a next critical data burst. A head-of-line frame refers to a next frame in a queue to be forwarded from the queue to the first multiplexer 302.

Data in any of the non-Class A queues 280, 282 may be blocked prior to a next critical data burst window. For example, a non-Class A queue may have a maximum head-of-line frame (e.g., 1522 bytes) ready to be transmitted prior to a next Class A burst window. If the head-of-line frame cannot be transmitted completely prior to the start of the Class A burst window, then the blocking shaper may block (delay) transmission of the head-of-line frame. A frame in another one of the non-Class A queues having fewer bytes (e.g., 64 bytes) than the frame in the non-Class A queue may be permitted to pass to the multiplexer 315, as the smaller frame may be transmitted prior to the next Class A burst window.

Figure 9:
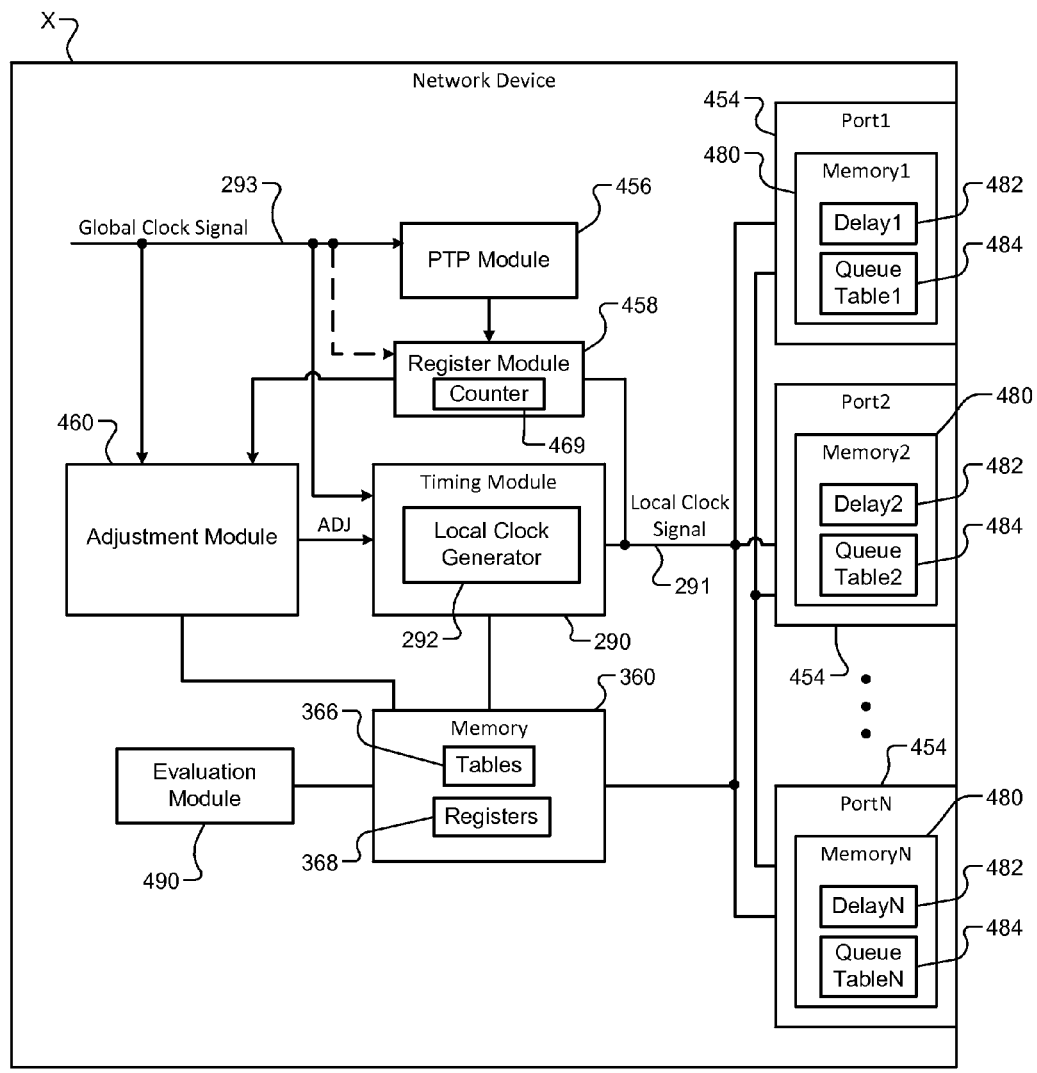
FIG. 9 is a functional block diagram of a network device incorporating a window locking system in accordance with an aspect of the present disclosure.

Referring now to FIG. 1 and FIG. 9, which shows a network device 450 including a window locking system 452, the memory 360 and multiple ports 454. The network device 450 may include the ingress module 272 and egress module 274 of FIG. 5, where an egress module similar to the egress module 274 may be included in each of the ports 454. The window locking system 452 includes the timing module 290, a PTP module 456, a register module 458, and an adjustment module 460. The timing module 290 includes the local clock generator 292 that generates the local clock signal 291.

The PTP module 456 may generate a trigger signal based on the global clock signal 293. The register module 458 captures times of rising edges of the local clock signal 291 based on the global clock signal 293 and/or the trigger signal, as shown. In one embodiment, the register module 458 captures times of the rising edges of the local clock signal 291 based on the global clock signal 293. The times of the rising edges of the local clock signal 291 may be provided to the adjustment module 460. The register module 458 may store a bit indicating when a rising edge has been detected. The bit may be stored in one of the registers 368 or an event capture register in the register module 458. The trigger signal may indicate when the rising edge has occurred and/or when the local clock signal 291 is in a HIGH state. The adjustment module 460 adjusts timing of the rising edges of the local clock signal 291 based on (i) times of edges of the global clock signal 293, and (ii) the times of the edges of the local clock signal 291.

The register module 458 may include a counter 469, which may be a free running counter that is used to determine an amount of error or differences in time between (i) times of rising edges of the global clock signal 293 and (ii) times of rising edges of the local clock signal 291. The count value of the counter 469 may increment at a faster rate than a frequency of the local clock signal 291. The count value may be converted into time to indicate the error, which may be forwarded to and used by the adjustment module 460 to adjust the edges of the local clock signal 291.

As shown in FIG. 1, the adjustment module 460 determines windows (window 470, 472 are shown) within which rising edges of the local clock signal 291 are expected to occur based on rising edges of the global clock signal 293. One of the registers 368 may be used to store a width of the windows. As an example, a TrigLockRange (or locking window) register may be used and may be a four bit register. The locking window register may be used to restart or re-lock the local clock signal 291. The adjustment module 460 may adjust start, end and/or durations of the windows associated with the locking window register. The adjustment module 460 adjusts in time upcoming rising edges of the local clock signal 291 based on previous rising edges of the global clock signal 293 such that the rising edges of the local clock signal 291 are at respective centers of the windows. This may include determining: start and end times of the windows relative to determined times of upcoming rising edges of the global clock signal 293; durations of the windows; centers of the windows; and positive and/or negative amounts of adjustment to rising edges of the local clock signal 291. As a result, lengths of cycles of the local clock signal 291 may be decreased and/or increased to lock the local clock signal 291 to the global clock signal 293 in frequency and/or to lock the local clock signal 291 to be delayed a predetermined amount time from the global clock signal 293.

The memory 360 may stores the tables 366 including a port table, which stores port states and port delay times. The ports 454 may include respective memories 480 that store the respective delay times 482 and queue tables 484.

In order to lock the local clock signal 291 to the global (or grandmaster) clock signal 293, the timing module 290 may compare the signals 271, 293 and based on the comparison adjust the local clock signal accordingly. This is referred to as clock compensation and may correct 99.9% of an error between the signals 271, 293. Although rising edges of the signals 271, 293 are primarily referred to herein as being monitored and/or adjusted, falling edges of the signals 271, 293 may be monitored and/or adjusted. Since rising and/or falling edges of the local clock signal 291 can be observed, clock compensation can be continuously and/or periodically monitored and adjusted.

Over a very long period of time (days), long distances, and/or situations where the global and/or local clocks drift due to, for example, temperature changes, additional correction is performed to maintain lock of the local clock signal 291. This is accomplished via the register module 458 to 'see' where the rising edge of the local clock signal 291 is relative to a corresponding rising edge of the global clock signal 293. Also, if the local clock signal 291 is close to the same PPM as the global clock signal 293, a problem can occur if the clock compensation is barely positive (close to 0) and then drifts negative (or vice versa). Since this is not unlikely, the window lock system 452 is provided to re-align the rising edge of the local clock signal 291 while the local clock signal 291 is being generated. A configuration register (e.g., one of the registers 368) having a TrigLock one-shot enable bit and TrigLockRange bits is provided. The TrigLock one-shot enable bit is a self-clear bit that indicates when to enable rising edge adjustment of the local clock signal 291. When this bit is set to a one the rising edge of the local clock signal 291 is adjusted to the value contained in a TrigGetTime register (one of the registers 368) if and only if the rising edge of the local clock signal 291 occurs +/− a predetermined number of PTP clock cycles as defined by the TrigLockRange bits.

Once the range indicated by the TrigLock Range bits is past in time, the TrigLock one-shot enable bit self clears (i.e., the TrigLock one-shot enable bit is set (or active) for one correction per wrap around of a local time of a local clock). For example, the local clock may be a 32-bit local timer, which may be included in the timing module 290 or the local clock generator 292. This bit clears regardless of whether a correction was performed. The TrigLock one-shot enable bit and corresponding TrigLockRange allows a correction to be performed sometime in the future. As an example, it may take more than 30 seconds for the local clock timer to wrap. The correction may occur on a specific rising edge of local clock signal 291 if that rising edge is within a corresponding window (i.e., within the TrigLockRange window). Examples of this type of window are shown in FIG. 1. The TrigLockRange bits provide plus and minus error limits in which to adjust the rising edges of the local clock signal 291. If the rising edges falls within the plus and minus limits of the window, the rising edge or one or more subsequent rising edges of the local clock signal 291 are adjusted to be centered in the corresponding TrigLockRange (or adjustment window).

The registers 368 may also include a status register. The status register may include a capture trigger bit, which is a read, write and reset bit. When the capture trigger bit is cleared to a zero, the register module 458 monitors rising edge events of the local clock signal 291 and captures the events in the event capture register (1-bit register). This allows assures that edges have not drifted over time, thereby allowing upcoming edges to be re-aligned.

The configuration register may further include lock correction valid bit and lock correction amount bits, which are used to monitor whether a correction has occurred and the amount of the correction. This information may be fed back to the adjustment module 460 or an evaluation module 490 for further adjustments in the edges of the local clock signal 291 and/or for evaluating performance of the window locking system 452.

The lock correction valid bit is a 0 if the correction is not valid or did not occur. The lock correction valid bit is a 1 if the correction is valid and the correction did occur. When the TrigLock one-shot enable bit is set, thereby enabling a potential local clock signal adjustment, the lock correction valid bit is cleared to 0. When the TrigLock one-shot enable bit is cleared, the lock correction valid bit is set to 1 if the correction did occur and is valid. The lock correction amount bits indicate the amount of correction that was made during the correction. When the TrigLock one-shot enable bit is set to 1, the lock correction amount bits are cleared to 0. When the TrigLock one-shot enable bit is cleared to 0, the lock correction amount bits reflect the magnitude and direction that was applied to a leading edge of the local clock signal 291. If the lock correction amount bits are 0, then no adjustment was necessary. If bit 3 of the lock correction amount bits is a 1, then the leading edge of the local clock signal 291 was moved n number of clock cycles earlier in time, where n is an integer provided by bits 0-2 of the lock correction amount bits. If bit 3 is a 0, then the leading edge of the local clock signal 291 was moved n number of clock cycles later in time.

FIG. 10 shows a ring network 490, such as an industrial network or a controller area network. The ring network 490 includes one or more rings (e.g., rings 491, 492, 493). Each of the rings includes multiple network devices (or stations) 494, which may communicate with each other in either clockwise or counterclockwise directions around the corresponding one of the rings. Each of the network devices 494 on a first ring (e.g., ring 491) may communicate with any of the network devices on the other rings (e.g., rings 492, 493). Data is transferred from network device-to-network device until arriving at the target network device. Certain network devices (e.g., network devices 495) may operate as gateways between rings and communicate via links 496 between the rings.

Each of the network devices on the rings may receive a global (or grandmaster) clock signal. Each of the network devices may be configured as shown and described with respect to FIGS. 1-9 and 12-16. Each of the network devices, chips of the network devices, and/or modules (e.g., timing modules, data pass modules, adjustment modules) of the network devices may also be aware of a corresponding delay from the global clock signal of a respective local clock signal for that network device. Each of the network devices, chips of the network devices, and/or modules (e.g., timing modules, data pass modules, adjustment modules) of the network devices may also be aware of "neighbor weight ratios", which refer to time delays between the global clock signal and respective local clock signals of other network devices in the same network and/or on the same ring. Each of the network devices, chips of the network devices, and/or modules (e.g., timing modules, data pass modules, adjustment modules) of the network devices may compensate for these time delays when adjusting and maintaining lock of a corresponding local clock signal. This may be done via timing modules of the respective network devices.

In one embodiment, when a frame or packet is being transmitted between network devices on a same ring, a cut-through method as disclosed herein may be used by the network devices and/or other network devices on the same ring to efficiently transfer the frame or packet. If the frame or packet is being transmitted between network devices on different rings, the corresponding network devices that perform as gateways may store and forward the frame or packet without using a cut-through method. This causes transmission timing of the frame or packet to be retimed when being sent between rings.

As disclosed herein, each port of a network device has an independent Port $t_0$ time corresponding to a rising edge of a local clock signal. The Port $t_0$ time is generated based on a delay time for that port and a global clock signal. Each port may restart Qbv table processing at the corresponding Port $t_0$ time. This is supported by a per port programmable delay register, which defines the time between a global clock signal time Global $t_0$ and the Port $t_0$. The Qbv table of each port is used to define which of the queues of that port are open and closed (transmit capable or blocked) and for how long the queues of that port are open and closed. Each Qbv table of a port may support 16 entries, where each entry includes: per queue blocking bits; the time to hold the open or closed state; and a single guard band bit. The guard band bit indicates that the Qbv guard band values of the port should be applied for a defined time period prior to corresponding blocking bits being applied. This helps reduce the table size and supports small frame (or packet) transmission utilization during the guard band.

Skewing Local Clock $t_0$ from Port to Port

A per port programmable delay register in the Qbv register space (e.g., in the memory 360 of FIG. 9) may be used to define time between a local clock $t_0$ and a Port $t_0$. This approach negates the need for the local clock signal to be changed for each port and allows for only a single local clock $t_0$ to be used for all of the ports of a network device.

Reset to Qbv Operating Configuration Steps

Figure 11:
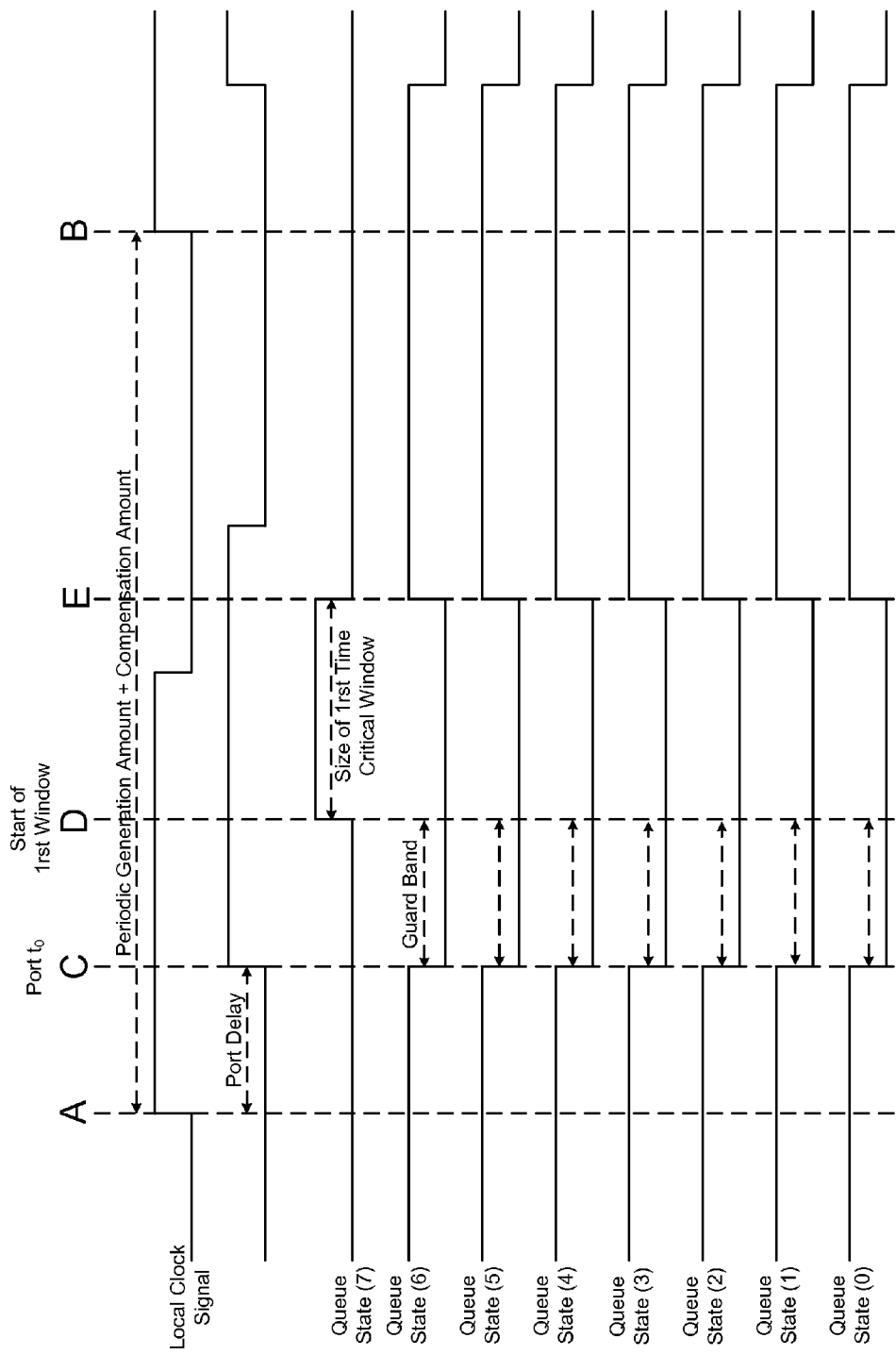
FIG. 11 is a timing plot illustrating a Qbv window in accordance with an aspect of the present disclosure.

FIG. 11 shows a timing plot illustrating a Qbv or first time critical window. At a reset time all queue states are reset to 1 enabling the queues to transmit. Also, at the reset time the local clock $t_0$ is not running such that there is no rising edge to define the local clock $t_0$.

Figure 12:
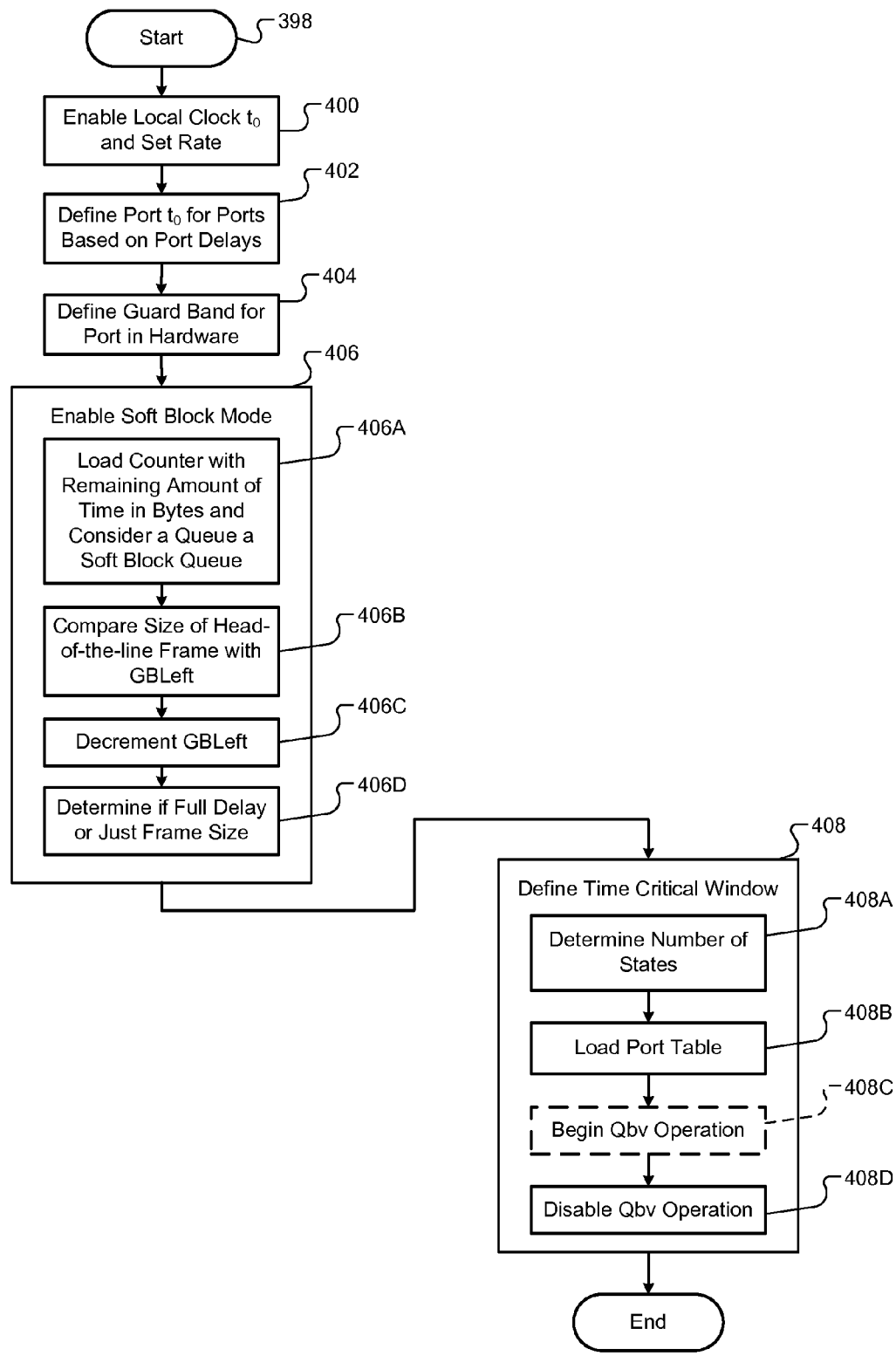
FIG. 12 illustrates a time aware blocking configuration method in accordance with an aspect of the present disclosure.
Figure 15:
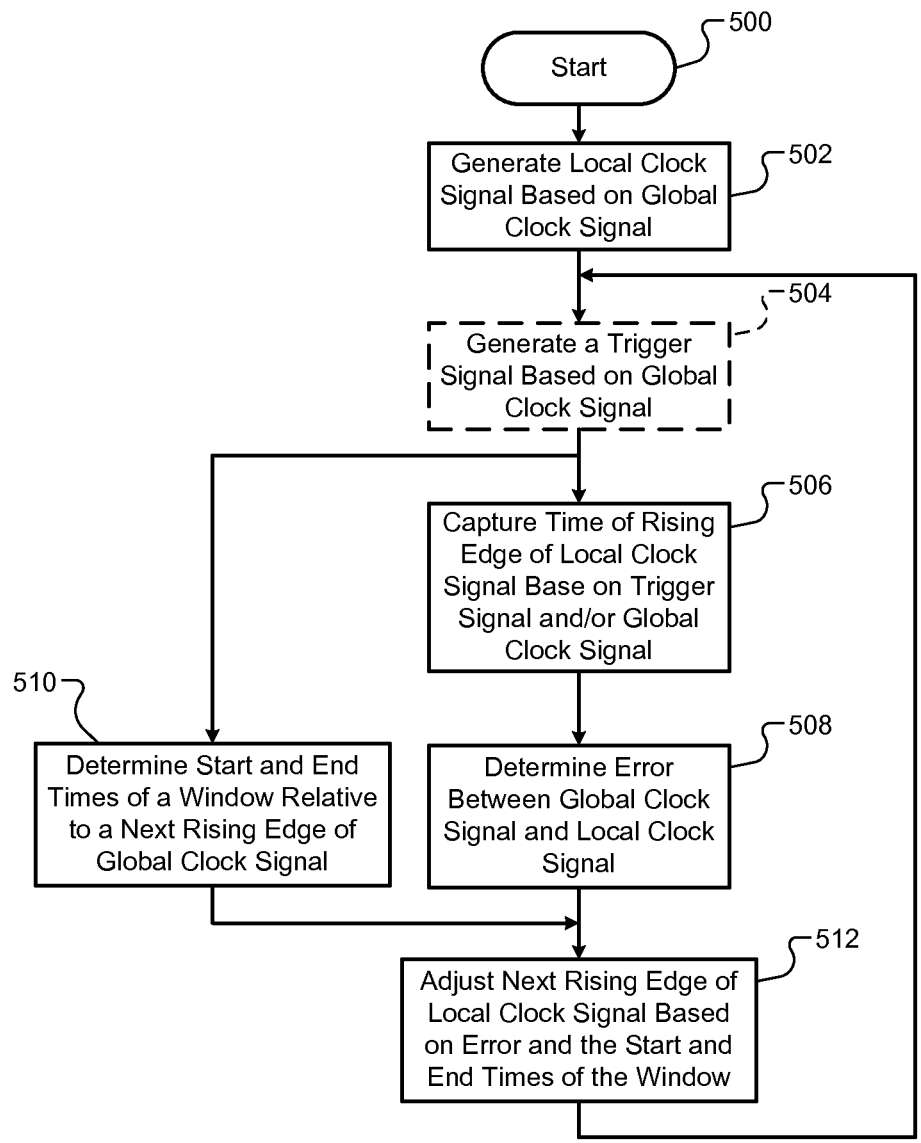
FIG. 15 illustrates local clock locking method in accordance with an aspect of the present disclosure.
Figure 16:
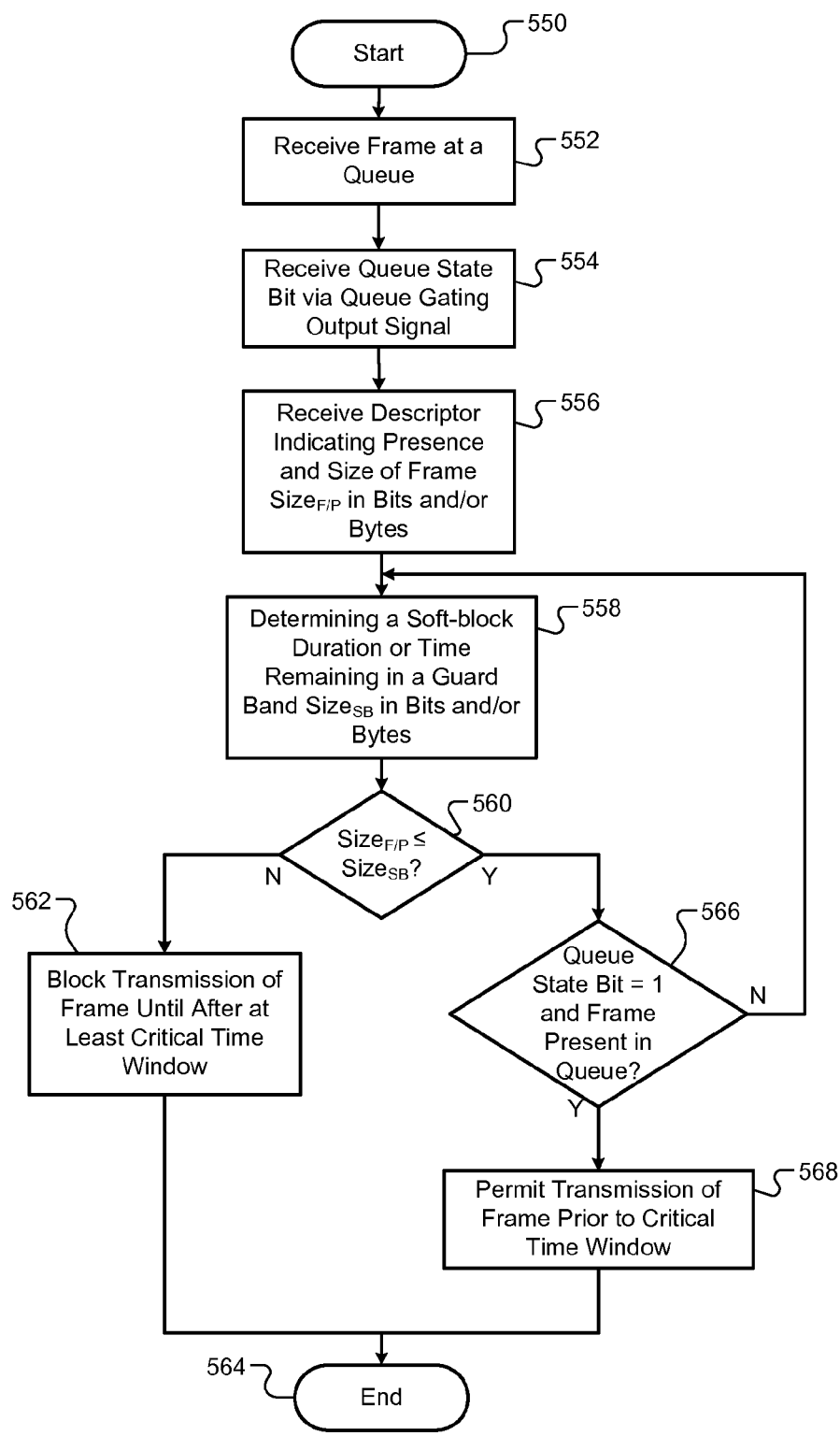
FIG. 16 illustrates a soft-blocking method in accordance with an aspect of the present disclosure.

The network device 270 of FIG. 5 may be operated using numerous methods, example methods are provided in FIGS. 12 and 15-16. In FIG. 12, a time aware blocking configuration method is shown. Although the following tasks are primarily described with respect to the implementations of FIGS. 1-11, the tasks may be easily modified to apply to other implementations of the present disclosure. Also, although the following tasks are described with respect to a certain number of time-unaware blocking shapers, time-aware blocking shapers, and frames, the tasks may be easily modified to accommodate a different number of each. The tasks may be iteratively performed.

The method may begin at 398. At 400, the timing module 290 enables the local clock $t_0$ and sets the rate (or frequency) of the local clock. The local clock $t_0$ time is represented by line A in FIG. 11 and the rate is represented by the time between lines A and B. A trigger generation (Trig Gen) time and a Trig Gen amount are used for setting the local clock $t_0$ time and the rate. Each Qbv table of the ports is processed at every $t_0$ (since the local clock is now toggling) and since the 1$^{st}$ entry in each Qbv table defines a queue state of 1 and a time 0, nothing happens (as nothing should happen if the corresponding Qbv table has not been modified since being reset).

At 402, each Port $t_0$ is defined. The Port $t_0$ are defined based on predetermined delays from the local clock $t_0$. An example of this delay is represented by the time between lines A and C in FIG. 11. The timing module 290 sets a predetermined time for the start of the 1$^{st}$ time critical window and knows the time of the local clock $t_0$ and length of the guard band. Based on this information, the timing module 290 may determine the port delay, as provided by equation 1.

$$\text{Port Delay} = \text{Local Clock } t_0 + \text{Start Time of 1}^{st} \text{ Window} - \text{Duration of Guard Band} \qquad (1)$$

The duration of the guard band is the time to transmit a maximum size frame (or packet) out a port plus a gap delay such that the port is idle at the beginning of the 1$^{st}$ window (or blocking window) assuming no new frames or packets have started to be transmitted. The port delay may be used to point to the start of the guard band.

At 404, the guard band may be defined in hardware. The guard band is used to insure a port is idle at the start of the 1$^{st}$ window when the time critical data is to egress the port. This method of preventing congestion allows for the lowest possible latency in a network. To insure the port is idle, a new frame must not be allowed to start transmitting out the port unless the transmission of the frame can finish prior to the end of the guard band. Therefore, the start of the guard band is based on a maximum frame (or packet) size and is prior to the start of the 1$^{st}$ window. The typical maximum frame size on a network is 1522 bytes as this is the maximum size of IEEE tagged frames. Although for the example described, the maximum frame size is 1522 bytes, the maximum frame size may be any predetermined size. The size of the guard band is programmed in TX bytes such that the guard band is easy to match to the maximum frame size used in the network.

At 406, a soft-block mode is enabled. For a soft block on ports 0-6, queue states of the ports 0-6 are set to 0 and the guard band (or GB bytes) is set to 1522 bytes. Any queue state bits that go from a 1 to a 0 by this guard band setting performs a 'soft block', which allows frames to egress the queue as long as transmission of the frames can finish prior to an end of the guard band.

A soft block may be accomplished as provided by the following tasks 406A-406D. At 406A and at a start of a guard band, a counter (e.g., counter module 362 of FIG. 8) is loaded with a remaining amount of time in the guard band (GBLeft) and/or a duration of the guard band (e.g., 1522 bytes or an equivalent of 1522 bytes in time). The corresponding queue is considered a 'soft block' queue if the corresponding queue state changed from 1 to 0 at a start of the guard band.

At 406B and for all 'soft block' queues, the size of a corresponding head of line frame is compared to the current value of GBLeft. If the size of the frame is equal to or less than GBLeft that frame/queue can be presented to a scheduler (e.g., the timer module 290 or the selector module 298 of FIG. 5) for consideration for possible start of transmission.

At 406C and depending upon a speed of a port, the GBLeft time is decremented, for example, as follows:
  a. @10 Mbps every 100 8 ns clock cycles, decrement GBLeft by 1.
  b. @100 Mbps every 10 8 ns clock cycles, decrement GBLeft by 1.
  c. @1 Gbps every 1 8 ns clock cycle, decrement GBLeft by 1.
  d. @10 Gbps every 18 ns clock cycle, decrement GBLeft by 10 (with zero clip).
  e. Go back to task 408 until GBLeft=0.

At 406D, when GBLeft=0 there is likely a few byte times (each byte time being an amount of time to transmit a byte) needed prior to a cut-through connection to this port being permitted. The number of byte times (referred to as "extra bytes") may be determined and the guard band time may be held (or expanded) this number of extra bytes prior to proceeding to the start of the time critical window (or 1$^{st}$ window). The extra time refers to additional delay, which may be the same as a total of the byte times. Based on the number of byte times, a determination is made whether the byte times are added to the duration of the guard band or whether another field is used to provide an extended period prior to blocking. In other words, a determination is made as to whether the corresponding table includes a full delay (frame size plus extra time for comparison) or just the frame size. If there is a full delay, then the timing module subtracts the 'extra' or full delay for the frame size comparisons. At this time, the guard band is defined, but not being accessed such that Qbv operation has not yet been activated, although the Qbv table is being accessed at the start of each Port $t_0$.

At 408, the time critical window is defined. The last step to enable Qbv operation on a port is to define one or more time critical windows. At 408A, the timing module 290 may determine how many states are needed to define the windows. A simple window has two states (an opening state and a closing state). At 408B, from a last state to a first state, the port table is loaded with higher entry numbers first. At 408C, once the first entry is loaded, Qbv operation (or time aware blocking operation) automatically begins on the port. At 408D, Qbv operation on the port may be disabled by re-initializing the first entry with a default/reset values, where the queue states are equal to 1, the guard band is equal to 0, and duration of the time critical window is 0.

Non-Cut Through Bridge with Re-Timing of Critical Frames

The example discussed above with respect to FIG. 11 shows an example where the time critical frames mapped to queue 7 can be re-timed to egress the port at the start of the $1^{st}$ window, as long as these time critical frames are already stored in queue 7. This is referred to as a store and forward approach. While this approach can add more latency, this approach is useful for large networks to be able to re-time frames at specific points.

Cut Through of Critical Frames—Lowest Latency

To get lower latency a cut through approach for queue 7 can be used. If the configuration in FIG. 11 is used, the time critical frames cannot be re-timed as the cut through point needs to be after the start of the $1^{st}$ window otherwise the frames are stored and forwarded. If this is done, the frames may arrive too late to be transmitted within the window if the window is small. Getting the timing right on one of these systems can be complex. Since the re-timing of the time critical frames is not useful with cut through, an alternate approach may be used and is described with respect to FIG. 12.

Qbv with 1 Window—Cut Through Mode

Figure 13:
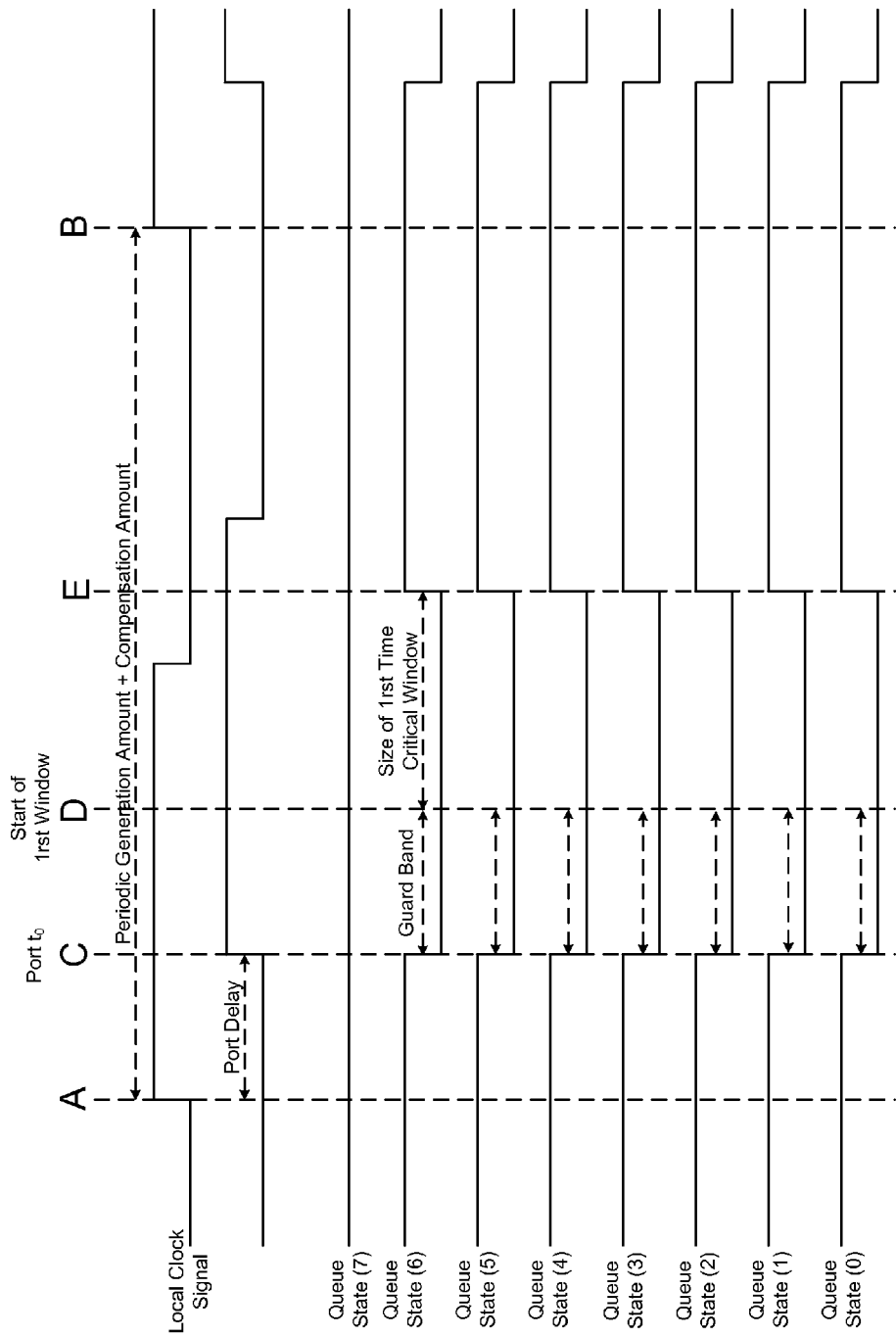
FIG. 13 is a timing plot for a cut-through mode in accordance with an aspect of the present disclosure.

FIG. 13 shows a timing plot, which is similar to the timing plot of FIG. 11, but is for a cut-through mode. During this mode, queue 7 is never blocked. This is accomplished by loading the Qbv table as follows: Port's Guard Band Entry is such that queue 7 is open and queues 0-6 are soft blocked; Port's Entry 1 is such that queues 0-7 are open until an end of a cycle of the Qbv table; and Port's Entry 0 is such that queues 0-6 are closed and queue 7 is opened.

Configuring Multiple Windows

Figure 14:
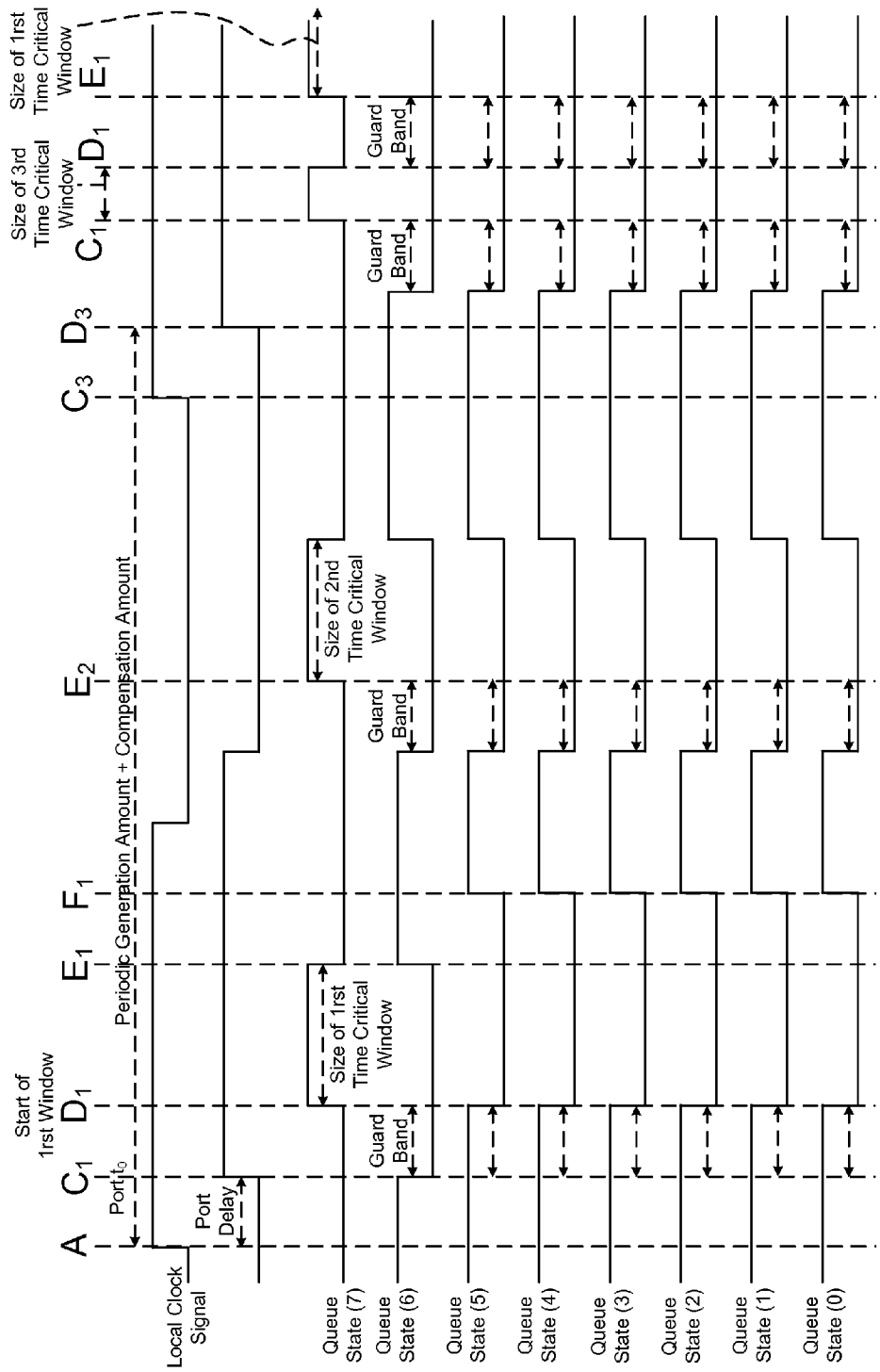
FIG. 14 is a timing plot illustrating multiple Qbv windows in accordance with an aspect of the present disclosure.

FIG. 14 shows a timing plot illustrating multiple Qbv windows. The port Qbv entries in the Qbv table can be configured to support multiple windows per cycle of the local clock signal 291. To fit more windows into a local clock cycle, the rate is increased. In FIG. 14, the $1^{st}$ window is shown with a different pattern, where queue 6 is opened prior to queues 0-5. To accomplish this, an extra Qbv table entry is provided. If the scheduler were set in a strict mode, this may not be necessary. Second and third windows are shown. The third window is shown extending into a next local clock cycle, but being cut off early at a $2^{nd}$ $C_1$ line. At the second $C_1$ line a $1^{st}$ entry in the Qbv table is processed (regardless of where processing of the Qbv table was previously occurring) followed by the guard band for the $1^{st}$ window starting. In this case, the guard band is useless as none of the queues states are transitioning from a 1 to a 0, which enables a 'soft block'. The $3^{rd}$ (or overlapping) window is an error. As a result, a correction does not need to be made for the guard band subsequent to the $3^{rd}$ window. Edges of a subsequent $3^{rd}$ window are corrected.

The above described port delay times that are part of a port table may be stored in one or more port registers. A respective port register may be provided for each port delay time. The port delay registers allow for indirect adjusting of restart times of ports based on the port delays stored in these registers. The port delays may be predetermined and loaded up at start-up of a corresponding network device. The port registers may be read, write, and reset registers. Each of the port delay times indicates a respective delay from a local clock $t_0$ to respective port $t_0$ (where the port $t_0$ is the time where the port starts processing according to a respective Qbv table.

A control register may be provided per port and stored in the memory 360. Information provided by the control register is shown in below table 1. The control register includes an update field, a pointer field, and queue state fields. The update filed is a self-clear (SC) field. The pointer field is a read, write, and reset (RWR) field. The queue state fields are read, write and set (RWS) fields.

TABLE 1

Control Register

| Field | Type | Description |
| --- | --- | --- |
| Update | SC | Update Data. When this field (or bit) is set to a one the data written to bits 0-7 of this register, along with bits 0-15 of the port Qbv table data register are loaded into the port Qbv table entry referenced by the pointer field. After the data is written, this field self clears to zero. |
| Pointer | RWR | Points to an entry in the port Qbv table for both read and write operations. A write operation occurs if the update field is a 1. The queue state bits in this register can be written at the same time by writing this register in a single operation. The guard band and time bits are written prior to the writing of this register. Otherwise, a read of the current pointer field occurs and the data found there is placed in the queue state bits (in this register) and the guard band and time bits below. The pointer bits are used to access an index of data and guard band registers as follows: Qbv Entries (defined in below provided data register of Table 2) Guard Band Entry (defined in below provided guard band register) Entry 0 of this table is processed on this port at the local $t_0$ time (as defined by local clock signal) plus this port's port delay time. This re-starting of the table entry processing occurs if the entry processing has completed or not. Once an entry is done being processed, the next higher entry number in the Qbv table is processed until entry 16 of a 16 entry table is completed. If entry 16 is completed the default entry is applied. The default entry has a queue state of all 1s, guard band = 0, and a window duration time = 0. The reset state of the Qbv table causes no queue |

TABLE 1-continued

Control Register

| Field | Type | Description |
|---|---|---|
| | | blocking, effectively disabling Qbv operation. |
| Queue State Bits | RWS | Queue State for table entry n, where n = a value of the pointer field.<br>For both the Qbv (queue states and delays) and guard band entries, the queue state bits indicate which egress queues on this port are allowed to participate in the next frame selection for transmission by having these bits presented to the scheduler. Each of the queue state bits may indicate a priority of a corresponding queue. When a queue's queue state bit is set to a 1, that queue is eligible to transmit frames. When a queue's queue state bit is cleared to 0, that queue is blocked (i.e., framesin that queue are not available for transmission). |

The following table 2 is an example of a data register that may be stored in the memory 360.

TABLE 2

Data Register

| Bits | Field | Type | Description |
|---|---|---|---|
| 15 | Guard Band | RWR | When this bit is cleared to a 0, corresponding queue state bits are presented to the port's egress scheduler. This bit is typically used to re-open blocked queues at an end of a window or to provide a delay. When this bit is set to a 1, a guard band's entry is processed first and when that is done, the corresponding queue state bits are presented to the port's egress scheduler. This bit is typically used to start a window such that the port is guaranteed idle at the end of the guard band. |
| 14:0 | Window Time | RWR | Once the corresponding queue state bits are presented to the scheduler, the window time is used to define how long the queue states are to be maintained before a next entry in the Qbv table is processed.<br>A window time of all zeros is a special case which indicates the end of the Qbv table has been reached. In this case, this entry's queue state bits are applied to the port until the next Port $t_0$ time at which time processing resumes at entry 0 of the Qbv table.<br>The window time is interrupted by the next Port $t_0$ time (even if it is not all zeros) at which time processing resumes at entry 0 of this table. |

A guard band register may also be stored in the memory 360. Guard band bytes stored in the guard band register may be processed first followed by applying queue states and/or the window time of the data register. The guard band bytes are used to determine if a frame can be transmitted during a guard band and prior to a critical time window. A real time hardware comparison may be performed between sizes of head-of-line frames on queues of a port and a remaining guard band period to determine whether one or more of the frames can be sent out. A highest priority one of the frames in the queues that fits in a soft-block duration (or remaining portion) of the guard band is transmitted first. A magnitude comparator may be used to determine the frames that are able to be transmitted and have the highest priority.

TABLE 3

Guard Band Register

| Bits | Field | Type | Description |
|---|---|---|---|
| 15:14 | Reserved | RES | Reserved |
| 13:0 | GBBytes | RWR | Guard Band (GB) Bytes. If a Qbv table entry has a guard band bit set to a 1, the guard band bytes are processed prior to the Qbv table entry being processed. The guard band entry is processed by first presenting queue state bits of the guard band to the egress scheduler of the corresponding port. These queue state bits are held for the amount of time it takes to transmit the number of bytes indicated in the corresponding GBBytes field.<br>The guard band works differently in the following ways:<br>The period of time that the guard band lasts is defined in transmit byte time increments. Thus, this parameter is port speed dependent. The GB bytes field may have a range of 1 to 16383 byte times. Queue state bits that were set to a 1 and that are now cleared to a 0 by the guard band's queue state bits are considered 'Soft Blocked'.<br>'Soft Blocked' queues are allowed to start the transmission of a frame as long as the transmission completely finishes prior to the end of the guard band time being reached.<br>GBBytes should be set to the size of a maximum size frame bytes to insure the egress port is idle when the end of the GBBytes time expires.<br>A GBBytes value of all 0 s holds the guard band time for a predetermined number of transmit byte times (i.e., a few clock cycles).<br>The predetermined number of transmit byte times is added at the end of each GBByte cycle before a calling Qbv entry is processed. This and the fact that GBByte times are port speed dependent is taken into account when defining the Port's $t_0$ time.<br>The GBBytes time is interrupted by the next Port $t_0$ time at which time processing resumes at entry 0 of this table. |

In FIG. 15, a local clock locking method is shown. Although the following tasks are primarily described with respect to the implementations of FIGS. 1-14, the tasks may be easily modified to apply to other implementations of the present disclosure. Also, although the following tasks are described with respect to a certain number of time-unaware blocking shapers, time-aware blocking shapers, and frames, the method may be easily modified to accommodate a different number of each. The tasks may be iteratively performed.

The method may begin at 500. At 502, the timing module 290 via the local clock generator 292 generates a local clock signal, which may be based on the global clock signal. At 504, a trigger signal may be generated by the PTP module 456, as described above. At 506, the register module 458 using the counter 469 captures a rising edge of the local clock signal. This may be based on the trigger signal generated at 504 and/or may be based on the global clock signal. This may include recording a timestamp of when the rising edge occurs.

At 508, the adjustment module 460 may determine start and end times of a comparison window for determining whether the rising edge has occurred within a predetermined range of a corresponding rising edge of the global clock signal. The start and end times of the window may be determined based on the rising edge of the global clock signal.

At 510, the adjustment module 460 and/or the timing module 290 may determine a difference in time, a number of bits, and/or a number bytes between the rising edge of local clock signal and the rising edge of the global clock signal. At 512, the adjustment module 460 and/or the timing module 290 adjusts timing of the local clock signal, such that a next rising edge of the local clock signal falls in a center of the comparison window and is at a same time as a next rising edge of the global clock signal. Examples of the comparison window are shown in FIG. 1. The width (or size), the start time and the end time of the comparison window may be adjusted and is centered on an edge of the global clock signal. Although this method is primarily described with respect to rising edges, the method may be altered such that falling edges of the clock signals are monitored and/or adjusted. Task 504 may be performed subsequent to task 512.

In FIG. 16, a soft-blocking method is shown. Although the following tasks are primarily described with respect to the implementations of FIGS. 1-15, the tasks may be easily modified to apply to other implementations of the present disclosure. Also, although the following tasks are described with respect to a certain number of time-unaware blocking shapers, time-aware blocking shapers, and frames, the method may be easily modified to accommodate a different number of each. The tasks may be iteratively performed.

The method may begin at 550. At 552, a frame is received at a queue (e.g., the queue 382). At 554, a queue state bit is received at a time-aware blocking shaper (e.g., the time-aware blocking shaper 380) via a queue gating output signal. At 556, a descriptor is received indicating presence and size of a head-of-the-line frame $Size_{F/P}$ in the queue. At 558, a size determination module (e.g., the size determination module 404) determines a soft-block duration or time remaining in a guard band in bits and/or bytes $Size_{SB}$.

At 560, a comparison module (e.g., the comparison module 402) determines whether the $Size_{F/P}$ is less than or equal to $Size_{SB}$. If $Size_{F/P}$ is not less than or equal to $Size_{SB}$, then task 562 is performed, otherwise task 566 is performed. At 562, a data pass module (e.g., the data pass module 386) blocks transmission of the head-of-the-line frame until after at least a corresponding and upcoming critical time window.

At 566, logic modules (e.g., the logic modules 384, 400) determine whether a queue state bit of the queue state output signal is 1 and the head-of-the-line frame is present in the queue 382. Task 566 may be performed prior to task 560. If the queue state bit is 1 and the head-of-line frame is present, then task 568 is performed, otherwise task 558 may be performed, as shown. At 568, the data pass module permits transmission of the head-of-the-line frame from the queue and/or corresponding network device during a guard band and prior to the critical time window. Another frame of another queue may be transmitted during the critical time window. The method may end subsequent to tasks 562 and 568 at 564.

The above-described tasks of FIGS. 12 and 15-16 are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

The above-disclosed techniques include non-arbitrary networks, which are engineered, managed, and controlled to minimize latency between end stations of the networks.

The wireless communications described in the present disclosure can be conducted in full or partial compliance with IEEE standard 802.11-2012, IEEE standard 802.16-2009, IEEE standard 802.20-2008, and/or Bluetooth Core Specification v4.0. In various implementations, Bluetooth Core Specification v4.0 may be modified by one or more of Bluetooth Core Specification Addendums 2, 3, or 4. In various implementations, IEEE 802.11-2012 may be supplemented by draft IEEE standard 802.11ac, draft IEEE standard 802.11ad, and/or draft IEEE standard 802.11ah.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

A network device is disclosed herein and includes a first queue, a first timing module, an adjustment module, a register module, and a blocking shaper. The first queue is configured to store a frame. The first timing module is configured to generate a local clock signal. The adjustment module is configured to determine (i) based on a first edge of a global clock signal, an expected time of a second edge of the global clock signal, and (ii) a window centered on the expected time of the second edge of the global clock signal. The register module is configured to capture a time of a first edge of the local clock signal. The adjustment module is configured to, based on the captured time of the first edge of the local clock signal and the time of the first edge of the global clock signal, generate an adjustment signal to center a second edge of the local clock signal in the window. The blocking shaper is configured to, subsequent to adjusting the second edge of the local clock signal, block transmission of the frame from the network device based on timing of the local clock signal.

In other features, the network device further includes ports and a memory. Each of the ports includes (i) queues, (ii) an egress module, and (iii) a respective one of multiple queue state tables. Each of the queue state tables includes entries. Each of the entries includes a state of a respective one of the queues for the corresponding port. The ports include a first port. The first port includes the first queue. Each of the egress modules is configured to cycle through the entries in a corresponding one of the queue state tables. The memory is configured to store a port table. The port table includes delays respectively for the ports. Each of the egress modules is configured to, based on the respective delay, start cycling through the queues for the corresponding port.

In other features, the egress module of the first port is configured to, based on the corresponding delay in the port table, delay from an edge of the local clock signal cycling of the entries in the corresponding one of the queue state tables. Each of the egress modules of the ports other than the first port is configured to, based on the corresponding delays in the port table, delay from an operation performed by a consecutively prior one of the ports cycling of the entries in the corresponding one of the queue state tables.

In other features, the first timing module or the adjustment module is configured to adjust timing of the local clock signal to adjust cycle start times of the ports through the tables. In other features, the first timing module or the adjustment module is configured to adjust timing of the local clock signal without adjusting the delays of the port table.

In other features, the first timing module or the adjustment module is configured to adjust timing of the local clock signal without adjusting durations or delays of the queue state tables of the ports. In other features, the adjustment module is configured to: if the captured time of the first edge of the local clock signal is not within a predetermined range of the time of the first edge of the global clock signal, refrain from adjusting timing of the local clock signal; and if the captured time of the first edge of the local clock signal is within the predetermined range of the time of the first edge of the global clock signal, adjust the timing of the local clock signal such that the second edge of the local clock signal is centered in the window.

In other features, the timing module is configured to generate the local clock signal based on the global clock signal. In other features, the network device further includes a second timing module configured to generate a trigger signal based on the global clock signal. The register module is configured to, based on the trigger signal, capture the time of the first edge of the local clock signal.

In other features, the register module is configured to, based on the global clock signal, capture the time of the first edge of the local clock signal. In other features, the network device further includes a memory configured to store a table. The table includes delay times. The delay times are for respective ports of the network device. Operational timing of the ports is based on (i) the delay times, and (ii) the local clock signal.

In other features, the delay times refer to respective amounts of delay from an edge of the global clock signal or the local clock signal. In other features, the network device further includes: a memory configured to store a table, where the table includes entries, where each of the entries includes (i) a state for a respective one of multiple queues, and (ii) a duration time to remain in the corresponding state; and an egress module configured to cycle through the entries of the table. The blocking shaper is configured to, based on a current one of the entries, block the frame from being transmitted from the network device.

In other features, the network device further includes a memory and an egress module. The memory is configured to store a table. The table includes entries, where each of the entries includes (i) a state for a respective one of multiple queues, and (ii) a delay time to wait prior to permitting transmission from a corresponding queue. The egress module is configured to cycle through the entries of the table. The blocking shaper is configured to, based on a current one of the entries, block the frame from being transmitted from the network device.

In other features, a network device is provided and includes a first queue, a first timing module, an adjustment module, a register module, a blocking shaper, ports and a memory. The first queue is configured to store a frame. The first timing module is configured to generate a local clock signal. The adjustment module is configured to determine (i) based on a first edge of a global clock signal, an expected time of a second edge of the global clock signal, and (ii) a window centered on the expected time of the second edge of the global clock signal. The register module is configured to capture a time of a first edge of the local clock signal. The adjustment module is configured to, based on the captured time of the first edge of the local clock signal and the time of the first edge of the global clock signal, generate an adjustment signal to center a second edge of the local clock signal in the window. The blocking shaper is configured to, subsequent to adjusting the second edge of the local clock signal, block transmission of the frame from the network device based on timing of the local clock signal. Each of the ports includes (i) queues, (ii) an egress module, and (iii) a respective one of multiple queue state tables, where each of the queue state tables includes entries, where each of the entries includes a state of a respective one of the queues for the corresponding port, where the ports include a first port, where the first port includes the first queue, and where each of the egress modules is configured to cycle through the entries in a corresponding one of the queue state tables. The memory is configured to store a port table, where the port table includes delays respectively for the ports.

Each of the egress modules are configured to, based on the respective delay, start cycling through the queues for the corresponding port. The egress module of the first port is configured to, based on the corresponding delay in the port table, delay from an edge of the local clock signal cycling of the entries in the corresponding one of the queue state tables. Each of the egress modules of the ports other than the first port is configured to, based on the corresponding delays in the port table, delay from an operation performed by a consecutively prior one of the ports cycling of the entries in the corresponding one of the queue state tables.

In other features, a method of operating a network device is provided. The network device includes a first queue. The method includes: storing a frame in the first queue; generating a local clock signal; determining (i) based on a first edge of a global clock signal, an expected time of a second edge of the global clock signal, and (ii) a window centered on the expected time of the second edge of the global clock signal; capturing a time of a first edge of the local clock signal; based on the captured time of the first edge of the local clock signal and the time of the first edge of the global clock signal, generating an adjustment signal to center a second edge of the local clock signal in the window; and subsequent to adjusting the second edge of the local clock signal, blocking transmission of the frame from the network device based on timing of the local clock signal.

In other features, the network device includes ports, where each of the ports includes (i) queues, (ii) an egress module, and (iii) a respective one of multiple queue state tables, where each of the queue state tables includes entries, where each of the entries includes a state of a respective one of the queues for the corresponding port, where the ports include a first port, and where the first port includes the first queue. The method further includes: via each of the egress modules, cycling through the entries in a corresponding one of the queue state tables; storing a port table, where the port table includes delays respectively for the ports; and via each of the egress modules and based on the respective delay, start cycling through the queues for the corresponding port.

In other features, the method further includes: via the egress module of the first port and based on the corresponding delay in the port table, delaying from an edge of the local clock signal cycling of the entries in the corresponding one of the queue state tables; and via each of the egress modules of the ports other than the first port and based on the corresponding delays in the port table, delaying from an operation performed by a consecutively prior one of the ports cycling of the entries in the corresponding one of the queue state tables.

In other features, the method further includes adjusting timing of the local clock signal to adjust cycle start times of the ports through the tables. In other features, the method further includes adjusting timing of the local clock signal without adjusting the delays of the port table. In other features, the method further includes adjusting timing of the local clock signal without adjusting durations or delays of the queue state tables of the ports.

In other features, the method further includes: if the captured time of the first edge of the local clock signal is not within a predetermined range of the time of the first edge of the global clock signal, refraining from adjusting timing of the local clock signal; and if the captured time of the first edge of the local clock signal is within the predetermined range of the time of the first edge of the global clock signal, adjusting the timing of the local clock signal such that the second edge of the local clock signal is centered in the window.

In other features, the method further includes generating the local clock signal based on the global clock signal. In other features, the method further includes generating a trigger signal based on the global clock signal, where the time of the first edge of the local clock signal is captured based on the trigger signal. In other features, the time of the first edge of the local clock signal is captured based on the global clock signal.

In other features, the method further includes: storing a table, where the table includes delay times, and where the delay times are for respect ports of the network device; and controlling operational timing of the ports based on (i) the delay times, and (ii) the local clock signal. In other features, the delay times refer to respective amounts of delay from an edge of the global clock signal or the local clock signal.

In other features, the method further includes: storing a table, where the table includes entries, where each of the entries includes (i) a state for a respective one of multiple queues, and (ii) a duration time to remain in the corresponding state; via an egress module of the network device, cycling through the entries of the table; and based on a current one of the entries, blocking the frame from being transmitted from the network device.

In other features, the method further includes: storing a table, where the table includes entries, where each of the entries includes (i) a state for a respective one of multiple queues, and (ii) a delay time to wait prior to permitting transmission from a corresponding queue; via an egress module of the network device, cycling through the entries of the table; and based on a current one of the entries, blocking the frame from being transmitted from the network device.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A network device comprising:
   a first queue configured to store a frame;
   a first timing module configured to generate a local clock signal;
   an adjustment module configured to determine (i) based on a first edge of a first cycle of a global clock signal, an expected time of a second edge of a second cycle of the global clock signal, and (ii) a window centered on the expected time of the second edge of the global clock signal, wherein each of the first edge and the second edge is a rising edge or a falling edge of the global clock signal;
   a register module configured to capture a time of a first edge of a first cycle of the local clock signal,
   wherein the adjustment module is configured to, based on the captured time of the first edge of the local clock signal and the time of the first edge of the global clock signal, generate an adjustment signal to center a second edge of a second cycle of the local clock signal in the window, and wherein each of the first edge of the local clock signal and the second edge of the local clock signal is a rising edge or a falling edge of the local clock signal; and
   a blocking shaper configured to, subsequent to adjusting the second edge of the local clock signal, block transmission of the frame from the network device based on timing of the local clock signal.

2. The network device of claim 1, further comprising:
   a plurality of ports, wherein each of the plurality of ports comprises (i) a plurality of queues, (ii) an egress module, and (iii) a respective one of a plurality of queue state tables, wherein each of the plurality of queue state tables comprises a plurality of entries, wherein each of the entries comprises a state of a respective one of the plurality of queues for the corresponding port, wherein the plurality of ports comprise a first port, wherein the first port comprises the first queue, and
   wherein each of the egress modules is configured to cycle through the plurality of entries in a corresponding one of the plurality of queue state tables; and
   a memory configured to store a port table, wherein the port table comprises a plurality of delays respectively for the plurality of ports,
   wherein each of the egress modules is configured to, based on the respective delay, start cycling through the plurality of queues for the corresponding port.

3. The network device of claim 2, wherein:
   the egress module of the first port is configured to, based on the corresponding delay in the port table, delay from an edge of the local clock signal cycling of the plurality of entries in the corresponding one of the plurality of queue state tables; and
   each of the egress modules of the plurality of ports other than the first port is configured to, based on the corresponding delays in the port table, delay from an operation performed by a consecutively prior one of the plurality of ports cycling of the plurality of entries in the corresponding one of the plurality of queue state tables.

4. The network device of claim 3, wherein the first timing module or the adjustment module is configured to adjust timing of the local clock signal to adjust cycle start times of the plurality of ports through the plurality of tables.

5. The network device of claim 4, wherein the first timing module or the adjustment module is configured to adjust timing of the local clock signal without adjusting the delays of the port table.

6. The network device of claim 4, wherein the first timing module or the adjustment module is configured to adjust timing of the local clock signal without adjusting durations or delays of the plurality of queue state tables of the plurality of ports.

7. The network device of claim 1, wherein the adjustment module is configured to:
   if the captured time of the first edge of the local clock signal is not within a predetermined range of the time of the first edge of the global clock signal, refrain from adjusting timing of the local clock signal; and
   if the captured time of the first edge of the local clock signal is within the predetermined range of the time of the first edge of the global clock signal, adjust the timing of the local clock signal such that the second edge of the local clock signal is centered in the window.

8. The network device of claim 1, wherein the timing module is configured to generate the local clock signal based on the global clock signal.

9. The network device of claim 1, further comprising a second timing module configured to generate a trigger signal based on the global clock signal,
   wherein the register module is configured to, based on the trigger signal, capture the time of the first edge of the local clock signal.

10. The network device of claim 1, wherein the register module is configured to, based on the global clock signal, capture the time of the first edge of the local clock signal.

11. The network device of claim 1, further comprising a memory configured to store a table, wherein:
   the table includes a plurality of delay times;
   the plurality of delay times are for respective ports of the network device; and
   operational timing of the ports is based on (i) the plurality of delay times, and (ii) the local clock signal.

12. The network device of claim 11, wherein the plurality of delay times refer to respective amounts of delay from an edge of the global clock signal or the local clock signal.

13. The network device of claim 1, further comprising:
   a memory configured to store a table, wherein the table includes a plurality of entries, wherein each of the plurality of entries includes (i) a state for a respective one of a plurality of queues, and (ii) a duration time to remain in the corresponding state; and
   an egress module configured to cycle through the plurality of entries of the table,
   wherein the blocking shaper is configured to, based on a current one of the plurality of entries, block the frame from being transmitted from the network device.

14. The network device of claim 1, further comprising:
   a memory configured to store a table, wherein the table includes a plurality of entries, wherein each of the plurality of entries includes (i) a state for a respective one of a plurality of queues, and (ii) a delay time to wait prior to permitting transmission from a corresponding queue; and an egress module configured to cycle through the plurality of entries of the table, wherein the blocking shaper is configured to, based on a current one of the plurality of entries, block the frame from being transmitted from the network device.

15. The network device of claim 1, wherein the adjustment module is configured to adjust timing of the second edge of the local clock signal to be centered in the window to account for drift between the local clock signal and the global clock signal.

16. The network device of claim 1, wherein:
a phase difference between the local clock signal and the global clock signal varies; and
subsequent to synchronization of the local clock signal to the global clock signal and prior to the adjustment module generating the adjustment signal, the local clock signal drifts from the global clock signal.

17. The network device of claim 16, wherein the local clock signal drifts from the global clock signal due to at least one of (i) a difference in operation between a local clock circuit of the local clock signal and a global clock circuit of the global clock signal, (ii) a duration of operation of the local clock circuit and the global clock circuit, and (iii) a temperature of the local clock circuit and a temperature of the global clock circuit.

18. A network device comprising:
a first queue configured to store a frame;
a timing module configured to generate a local clock signal;
a plurality of ports, wherein each of the plurality of ports comprises (i) a plurality of queues, (ii) an egress module, and (iii) a respective one of a plurality of queue state tables, wherein each of the plurality of queue state tables comprises a plurality of entries, wherein each of the entries comprises a state of a respective one of the plurality of queues for the corresponding port, wherein the plurality of ports comprise a first port, wherein the first port comprises the first queue, and
wherein each of the egress modules is configured to cycle through the plurality of entries in a corresponding one of the plurality of queue state tables; and
a memory configured to store a port table, wherein the port table comprises a plurality of delays respectively for the plurality of ports,
wherein
each of the egress modules is configured to, based on the respective delay, start cycling through the plurality of queues for the corresponding port,
the egress module of the first port is configured to, based on the corresponding delay in the port table, delay from an edge of the local clock signal cycling through the plurality of entries in the corresponding one of the plurality of queue state tables; and
each of the egress modules of the plurality of ports other than the first port is configured to, based on the corresponding delays in the port table, delay from an operation performed by a consecutively prior one of the plurality of ports cycling through the plurality of entries in the corresponding one of the plurality of queue state tables.

19. A method of operating a network device, wherein the network device comprises a first queue, the method comprising:

storing a frame in the first queue;
generating a local clock signal;
determining (i) based on a first edge of a first cycle of a global clock signal, an expected time of a second edge of a second cycle of the global clock signal, and (ii) a window centered on the expected time of the second edge of the global clock signal, wherein each of the first edge and the second edge is a rising edge or a falling edge of the global clock signal;
capturing a time of a first edge of a first cycle of the local clock signal;
based on the captured time of the first edge of the local clock signal and the time of the first edge of the global clock signal, generating an adjustment signal to center a second edge of a second cycle of the local clock signal in the window, wherein each of the first edge of the local clock signal and the second edge of the local clock signal is a rising edge or a falling edge of the local clock signal; and
subsequent to adjusting the second edge of the local clock signal, blocking transmission of the frame from the network device based on timing of the local clock signal.

20. The method of claim 19, wherein the network device comprises a plurality of ports, wherein each of the plurality of ports comprises (i) a plurality of queues, (ii) an egress module, and (iii) a respective one of a plurality of queue state tables, wherein each of the plurality of queue state tables comprises a plurality of entries, wherein each of the entries comprises a state of a respective one of the plurality of queues for the corresponding port, wherein the plurality of ports comprise a first port, wherein the first port comprises the first queue, the method further comprising:
via each of the egress modules, cycling through the plurality of entries in a corresponding one of the plurality of queue state tables;
storing a port table, wherein the port table comprises a plurality of delays respectively for the plurality of ports; and
via each of the egress modules and based on the respective delay, start cycling through the plurality of queues for the corresponding port.

21. The method of claim 20, further comprising:
via the egress module of the first port and based on the corresponding delay in the port table, delaying from an edge of the local clock signal cycling of the plurality of entries in the corresponding one of the plurality of queue state tables; and
via each of the egress modules of the plurality of ports other than the first port and based on the corresponding delays in the port table, delaying from an operation performed by a consecutively prior one of the plurality of ports cycling of the plurality of entries in the corresponding one of the plurality of queue state tables.

22. The method of claim 21, further comprising adjusting timing of the local clock signal to adjust cycle start times of the plurality of ports through the plurality of tables.

23. The method of claim 22, further comprising adjusting timing of the local clock signal without adjusting the delays of the port table.

24. The method of claim 22, further comprising adjusting timing of the local clock signal without adjusting durations or delays of the plurality of queue state tables of the plurality of ports.

25. The method of claim 19, further comprising:
if the captured time of the first edge of the local clock signal is not within a predetermined range of the time of the first edge of the global clock signal, refraining from adjusting timing of the local clock signal; and if the captured time of the first edge of the local clock signal is within the predetermined range of the time of the first edge of the global clock signal, adjusting the timing of the local clock signal such that the second edge of the local clock signal is centered in the window.

26. The method of claim 19, further comprising generating the local clock signal based on the global clock signal.

27. The method of claim 19, further comprising generating a trigger signal based on the global clock signal,
wherein the time of the first edge of the local clock signal is captured based on the trigger signal.

28. The method of claim 19, wherein the time of the first edge of the local clock signal is captured based on the global clock signal.

29. The method of claim 19, further comprising:
storing a table, wherein the table includes a plurality of delay times, and wherein the plurality of delay times are for respective ports of the network device; and
controlling operational timing of the ports based on (i) the plurality of delay times, and (ii) the local clock signal.

30. The method of claim 29, wherein the plurality of delay times refer to respective amounts of delay from an edge of the global clock signal or the local clock signal.

31. The method of claim 19, further comprising:
storing a table, wherein the table includes a plurality of entries, wherein each of the plurality of entries includes (i) a state for a respective one of a plurality of queues, and (ii) a duration time to remain in the corresponding state;
via an egress module of the network device, cycling through the plurality of entries of the table; and
based on a current one of the plurality of entries, blocking the frame from being transmitted from the network device.

32. The method of claim 19, further comprising:
storing a table, wherein the table includes a plurality of entries, wherein each of the plurality of entries includes (i) a state for a respective one of a plurality of queues, and (ii) a delay time to wait prior to permitting transmission from a corresponding queue;
via an egress module of the network device, cycling through the plurality of entries of the table; and
based on a current one of the plurality of entries, blocking the frame from being transmitted from the network device.

* * * * *